United States Patent
Khan et al.

(10) Patent No.: US 8,368,594 B2
(45) Date of Patent: Feb. 5, 2013

(54) TECHNIQUES FOR BAR CODE ASSISTED POSITIONING

(75) Inventors: Farooq Khan, Allen, TX (US); Sridhar Rajagopal, Plano, TX (US); Baowei Ji, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 12/816,864

(22) Filed: Jun. 16, 2010

(65) Prior Publication Data
US 2011/0074629 A1   Mar. 31, 2011

Related U.S. Application Data

(60) Provisional application No. 61/269,400, filed on Jun. 24, 2009.

(51) Int. Cl.
*G01S 1/08*   (2006.01)

(52) U.S. Cl. .................................................. 342/386
(58) Field of Classification Search .................. 342/386
See application file for complete search history.

(56) References Cited

U.S. PATENT DOCUMENTS

| 6,904,525 B1 * | 6/2005 | Berson et al. | 713/179 |
| 7,933,234 B2 * | 4/2011 | Iso et al. | 370/328 |

* cited by examiner

*Primary Examiner* — Harry Liu
(74) *Attorney, Agent, or Firm* — Jefferson IP Law, LLP

(57) ABSTRACT

A method and apparatus for generating a bar code and for using a bar code to assist with positioning are provided. The method for generating a bar code to assist with positioning includes obtaining Global Positioning System (GPS) assistance data, generating a bar code with the GPS assistance data encoded therein, and displaying the bar code. The method for using a bar code to assist with positioning includes scanning a bar code, obtaining GPS assistance data from the scanned bar code, receiving and locking onto one or more GPS signals by using the GPS assistance data, and determining a position using the received one or more GPS signals.

40 Claims, 21 Drawing Sheets

TECHNIQUES FOR BAR CODE ASSISTED POSITIONING

CROSS-REFERENCE TO RELATED APPLICATION

This application claims the benefit under 35 U.S.C. §119 (e) of a U.S. Provisional application filed on Jun. 24, 2009 in the U.S. Patent and Trademark Office and assigned Ser. No. 61/269,400, the entire disclosure of which is hereby incorporated by reference.

BACKGROUND OF THE INVENTION

1. Field of the Invention

Aspects of the present invention relate to techniques for bar code assisted positioning. More particularly, aspects of the present invention relate to techniques for bar code assisted positioning using Two-Dimensional (2D) bar codes.

2. Description of the Related Art

A Global Navigation Satellite System (GNSS) provides autonomous geo-spatial positioning with global coverage. The GNSS allows electronic receivers to determine their location (i.e., longitude, latitude, and altitude) to within a few meters using time signals transmitted along a line-of-sight by radio from satellites. Receivers on the ground with a fixed position may also be used to calculate the precise time as a reference for scientific experiments. As of 2009, the United States NAVSTAR Global Positioning System (GPS) is the only fully operational GNSS. The Russian GLONASS is a GNSS in the process of being restored to full operation. China has indicated it will expand its regional Beidou navigation system into the global COMPASS navigation system by 2015. The European Union's Galileo positioning system is a GNSS in initial deployment phase, scheduled to be operational in 2013.

Mobile Stations (MSs) with embedded Global Positioning System (GPS) capabilities are becoming a reality. The development of these MSs is being fuelled, in part, by the U.S. Federal Communications Commission's Emergency (E)-911 mandate requiring the position of an MS to be available to emergency call dispatchers. GPS enabled MSs will not only address E-911 but will also enable wireless Location Based Services (LBSs), which are emerging as a new opportunity for mobile network operators to generate new revenues. Services such as driving directions, identifying closest banks or restaurants, and tracking of people for social networking, safety or in emergency situations (via E-911 in North America and E-112 in Europe) are currently being deployed by wireless network operators.

LBSs rely on some method of computing a user's location. One simple method uses the nearest cell tower as an approximate position; this method is referred to as Cell IDentifier (ID) and is currently used by operators that have already introduced commercial LBS. While Cell ID accuracy (i.e., the size of the cell tower coverage, normally several kilometers) is adequate for a number of applications, it is clearly not sufficient to meet the demands of applications such as E-911. Thus, advanced positioning methods that leverage mobile-network resources have been proposed. These techniques can be divided into network-based and handset-based solutions such as GPS and in particular, Assisted-GPS (A-GPS). A GPS Satellite Constellation is described below with reference to FIG. 1.

FIG. 1 illustrates a GPS Satellite Constellation according to the related art.

Referring to FIG. 1, the GPS system, which is run by the US Department of Defense through an Air Force space division, uses a constellation of twenty-four satellites 1-24 around the earth 104. The satellites 1-24 are positioned in six Earth-centered orbital planes with four satellites in each plane. For example, satellites 17-20 are included in orbital plane 106.

A GPS receiver should be able to receive signals from about 10 satellites at a time in ideal circumstances, but far fewer can be received up reliably in most real-world conditions. All of the satellites constantly transmit data (e.g., the navigation message) over the same set of frequencies, using an encoding that allows 50 bits per second for a total of 1,500 bits of data to be demodulated from each satellite every 30 seconds.

On every minute and half-minute, each satellite transmits its notion of the precise time and its health, followed by its location and a path in orbit (i.e., the ephemeris) that is valid for as long as four hours. Each satellite also transmits a subset of data about the other satellites in orbit (i.e., the almanac), including a rougher position. It takes 25 navigation messages, all received perfectly over 12.5 minutes from a single satellite, to assemble a full almanac. A timestamp is also included as part of each 300-bit (six-second) segment or sub-frame of the message.

GPS satellites circle the earth twice a day in a very precise orbit and transmit signal information to earth. GPS receivers take this information and use triangulation to calculate a user's exact location. Essentially, the GPS receiver compares the time a signal was transmitted by a satellite with the time it was received. The time difference is used by the GPS receiver to determine how far away the satellite is. Now, with distance measurements from a few more satellites, the receiver can determine the user's position. A GPS receiver must be locked onto the signal of at least three satellites to calculate a Two-Dimensional (2D) position (i.e., latitude and longitude) as described below with reference to FIG. 2.

FIG. 2 illustrates 2D positioning based on three satellites according to the related art.

Referring to FIG. 2, a possible location 202 is determined using geometric trilateration based signals received from three satellites. With four or more satellites in view, the receiver can determine the user's Three-Dimensional (3D) position (i.e., latitude, longitude, and altitude) as described below with reference to FIG. 3.

FIG. 3 illustrates 3D positioning based on four satellites according to the related art.

Referring to FIG. 3, a possible location 302 is determined using geometric trilateration based on signals received from four satellites.

The satellites have highly accurate atomic clocks but the GPS receiver generally has a much less accurate and less expensive clock. As a result, the GPS receiver will not correctly determined the amount of time that it took for the radio waves to travel from the satellites. Accordingly, an incorrect position may be determined. Thus, an additional satellite signal is needed to correct the time error in order to determine the correct position.

GPS satellites transmit two low power radio signals, designated L1 and L2. Civilian GPS uses the L1 frequency of 1575.42 MegaHertz (MHz) in the Ultra High Frequency (UHF) band. The signals travel by line of sight, meaning they will pass through clouds, glass and plastic but will not pass through most solid objects, such as buildings and mountains.

A GPS signal contains three different bits of information, namely a pseudorandom code, ephemeris data, and almanac data. The pseudorandom code is simply an ID code that identifies which satellite is transmitting information. Ephemeris data is a set of parameters that can be used to accurately calculate the location of a GPS satellite at a particular point in time. The ephemeris data describes the path that the satellite is following as the satellite orbits the Earth. The GPS almanac is a set of data that every GPS satellite transmits, and the GPS almanac includes information about the state (health) of the entire GPS satellite constellation, and coarse data on every satellite's orbit. When a GPS receiver has current almanac data in memory, the GPS receiver can acquire satellite signals and determine initial position more quickly.

The receiver measures the transmit time of each message and computes the distance to each satellite. Geometric trilateration as shown in FIG. 2 and FIG. 3 is used to combine these distances with the location of the satellites to determine the receiver's location. In certain conditions, a conventional standalone GPS device has difficulty providing reliable positions in poor signal conditions. For example, when surrounded by tall buildings (resulting in multipath), or when the satellite signals are weakened when the GPS device is used indoors or under trees. In addition, when first turned on in these conditions, some GPS devices may not be able to download the almanac and ephemeris information from the GPS satellites, rendering them unable to function until a clear signal can be received continuously for up to 40 seconds.

It takes a minimum of 18 seconds after acquiring the signal to decode the ephemeris from the broadcast message, assuming that it did not drop or lose any data bits. In practice, Time-To-First-Fix (TTFF), when decoding ephemeris data, is in the range of 20-60 seconds for environments where the receiver has an unobstructed view of the sky. If the environment is harsh, such as an urban canyon or even indoors, the receiver may take much longer to recover the data bits, if it can recover them at all.

An A-GPS receiver can address these problems in several ways, using network elements such as either an assistance server or other data from a network. That assistance generally falls into two categories; information used to more quickly acquire satellites, or calculations done remotely. Some possible forms for GPS assistance data includes the following:

A list of visible satellites
Predicted GPS satellite Doppler and Doppler rates
Azimuth and elevation angles for the visible satellites
GPS satellite ephemeris information
GPS almanac
Satellite clock correction terms
Approximate GPS time
Precise GPS time A drawback of A-GPS is that the receiver requires access to an external network for accessing the assistance server. Moreover, some devices such as cameras can include an internal GPS receiver or connect to an external GPS device to obtain and add location information to the photos. However, these devices may not have access to an external network to obtain the assistance data. Furthermore, a device may not be able to reach an assistance server via a wireless link due to poor coverage or other reasons.

Accordingly, current positioning systems based on GPS suffer from large delays in determining an exact location because the GPS receiver needs to receive GPS data such as ephemeris and almanac information from the satellites before a location can be determined. While an A-GPS receiver may address these problems by using network elements such as an assistance server that can provide GPS assistance data to the receiver, the GPS receiver has a drawback in that it requires access to an external network for accessing the assistance server.

Another emerging trend in mobile services is bar codes, which are fast gaining traction as enablers for online content and services. Bar codes storing addresses and Uniform Resource Locators URLs may appear in magazines, on signs, buses, business cards or just about any object that users might need information about. Users with an MS including a camera function that are equipped with the correct reader software can scan the image of the bar code causing the MS's browser to launch and redirect to the programmed URL. This act of linking from physical world objects is known as a hardlink or physical world hyperlinks. Users can also generate and print their own bar codes for others to scan.

Both One-Dimensional (1D) and 2D bar codes exist. 1D bar codes (also referred to as linear bar codes) are one of the most widespread and well-known global identification applications and can be found anywhere in the world. The standards for 1D bar codes have been developed and adopted since the early 1970's. 1D bar codes are read by laser-based scanners (currently at point-of-sale and throughout the supply chain) and camera-based readers. An example of a 1D bar code is described below with reference to FIG. 4.

FIG. 4 illustrates a Universal Product Code (UPC) bar code according to the related art.

Referring to FIG. 4, the UPC has encoded therein a Global Trade Identification Number (GTIN). Here, the first and last digits are always placed outside the symbol to indicate Quiet Zones that are necessary for bar code scanners to work properly.

2D bar codes may contain more information than 1D linear bar codes, such as the UPC code. 1D bar codes get wider as more data is encoded. In contrast, the 2D bar codes make use of the vertical dimension to pack in more data.

Several 2D bar code symbologies have been standardized by the International Organization for Standardization (ISO) and the International Electrotechnical Commission (IEC). The ISO/IEC 18004 standard specifies a 2D bar code symbology referred to as Quick Response (QR) code. An exemplary QR code will be described below with reference to FIG. 5.

FIG. 5 illustrates a structure of a Version 7 symbol of a QR 2005 code according to the related art.

Referring to FIG. 5, the QR 2005 code symbol is constructed of nominally square modules set out in a regular square array and each includes an encoding region and function patterns. The encoding region includes format information 502, version information 504, and data and error correction codewords 506. The function patterns include a finder pattern 512, a separator 514, timing patterns 516, and alignment patterns 518. Payload data is not encoded in the function patterns. The QR 2005 code symbol is surrounded on all four sides by a quiet zone 520.

QR 2005 codes come in a variety of sizes. For example, there are forty sizes of QR 2005 code symbols, which are referred to as Version 1, Version 2 . . . . Version 40. Version 1 measures 21 modules×21 modules, Version 2 measures 25 modules×25 modules and so on increasing in steps of 4 modules per side up to Version 40 which measures 177 modules× 177 modules. The QR 2005 code illustrated in FIG. 5 is an example of a Version 7 of a QR code symbol. A Version 1 of a QR 2005 code symbol is described below with reference to FIG. 6.

FIG. 6 illustrates a structure of a Version 1 symbol of a QR 2005 code according to the related art.

Referring to FIG. 6, the Version 1 symbol of the QR 2005 code measures 21 modules×21 modules. The data is encoded in 2×4 blocks 600 with each block carrying 8-bits of data, namely bits 0-7.

2D codes may be encoded with a higher bit density by employing color, an example of which is described below with reference to FIG. 7.

FIG. 7 illustrates a High Capacity Color Bar code (HCCB) according to the related art.

Referring to FIG. 7, the HCCB code is a type of bar code that uses colored triangles, instead of black-and-white lines or squares used by other bar code systems. The HCCB code may also be referred to as a Microsoft™ Tag.

SUMMARY OF THE INVENTION

An aspect of the present invention is to address at least the above-mentioned problems and/or disadvantages and to provide at least the advantages described below. Accordingly, an aspect of the present invention is to provide techniques for bar code assisted positioning.

Another aspect of the present invention is to provide techniques for bar code assisted positioning using Two-Dimensional (2D) bar codes.

In accordance with an aspect of the present invention, a method for generating a bar code to assist with positioning is provided. The method includes obtaining Global Positioning System (GPS) assistance data, generating a bar code with the GPS assistance data encoded therein, and displaying the bar code.

In accordance with another aspect of the present invention, a method for using a bar code to assist with positioning is provided. The method includes scanning a bar code, obtaining GPS assistance data from the scanned bar code, receiving and locking onto one or more GPS signals by using the GPS assistance data, and determining a position using the received one or more GPS signals.

In accordance with yet aspect of the present invention, an apparatus for generating and displaying a bar code to assist with positioning is provided. The apparatus includes a GPS receiver for receiving signals from one or more GPS satellites and for obtaining GPS assistance data, a bar code generator for generating a bar code with the GPS assistance data encoded therein, and a display for displaying the bar code.

In accordance with still aspect of the present invention, an apparatus for using a bar code to assist with positioning is provided. The apparatus includes a bar code scanner for scanning a bar code, a bar code decoding module for obtaining GPS assistance data from the scanned bar code, and a GPS receiver for receiving and locking onto signals from one or more GPS satellites by using the GPS assistance data, and for determining a position of the apparatus using the received one or more GPS signals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
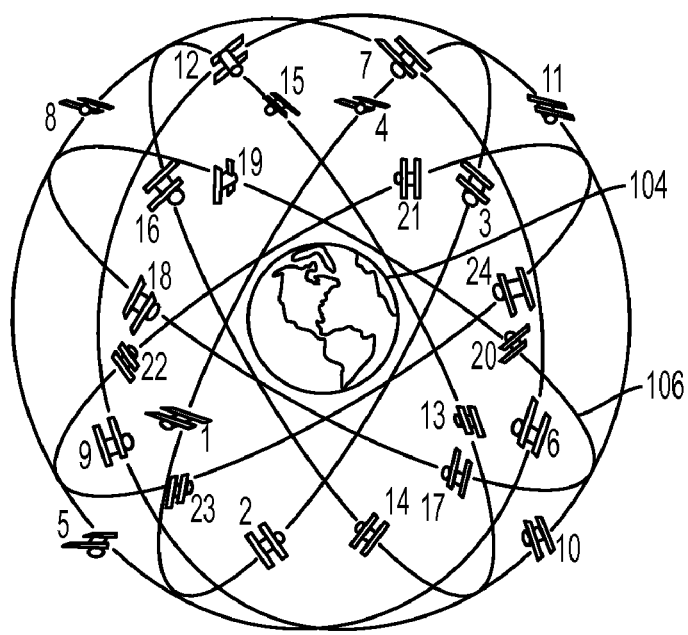
FIG. 1 illustrates a Global Positioning System (GPS) Satellite Constellation according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile device." However, it is to be understood that this is merely a generic term and that the invention is equally applicable to any of a Mobile Station (MS), a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile device" should not be used to limit application of the present inventive concepts to any certain type of apparatus or device.

Exemplary embodiments of the present invention described below relate to positioning using Two-Dimensional (2D) bar codes (hereafter referred to as 2D codes). While exemplary embodiments of the present invention are described herein as using 2D bar codes, the principles of the current invention are equally applicable to 1D bar codes as well as other methods of physical representation of information such as a Radio Frequency Identification RFID or Near Field Communication (NFC). In addition, while Quick Response (QR) codes may be described below as an example of 2D codes, the present invention is not limited to QR codes as the present invention is equally applicable when using other types of bar code.

It should be understood that the following description may refer to terms utilized in various standards merely for simplicity of explanation. For example, the following description may refer to terms utilized in an Open Mobile Alliance (OMA) Mobile Codes standard as well as an Institute of Electrical and Electronics Engineers (IEEE) 802.15.7 visible-light communication standard. However, this description should not be interpreted as being limited to such standards. Independent of the mechanism used for bar code assisted positioning, it is preferable to communicate data using bar codes and it is advantageous for that ability to conform to a standardized mechanism.

In the present invention, 2D bar codes, such as QR codes, are used to display Global Positioning System (GPS) assistance data as described below with reference to FIG. 8.

Figure 8:
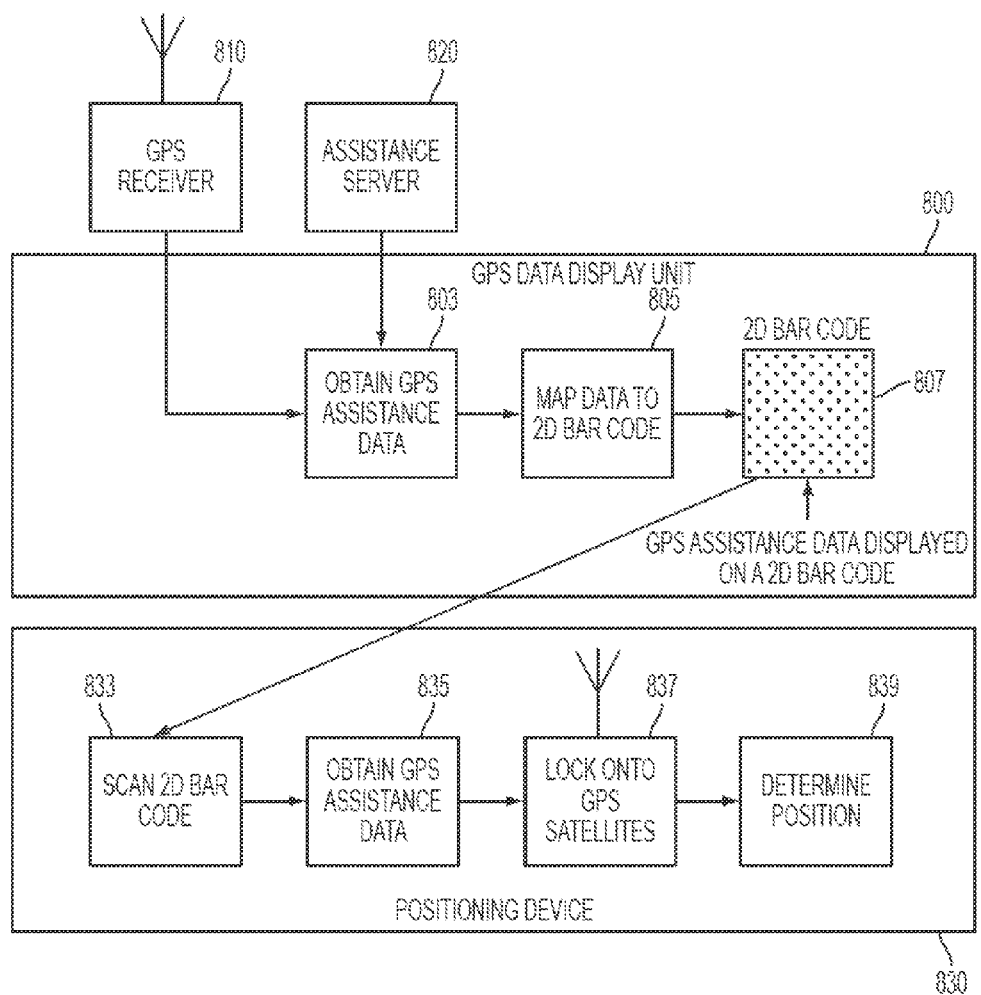
FIG. 8 illustrates GPS positioning using GPS assistance data provided via 2D bar codes according to an exemplary embodiment of the present invention.

FIG. 8 illustrates GPS positioning using GPS assistance data provided via 2D bar codes according to an exemplary embodiment of the present invention.

Referring to FIG. 8, a GPS data display unit 800 obtains GPS data from a GPS receiver 810 and/or an assistance server 820 in step 803. Here, the GPS receiver 810 may be a reference GPS receiver that receives GPS signals from one or more GPS satellites. In some cases, a first part of the GPS assistance data is obtained from the GPS receiver 810 and a second part of GPS assistance data is obtained from the assistance server 820. The GPS receiver 810 and/or a GPS antenna associated with the GPS receiver 810 is generally positioned to ensure an unobstructed view of the sky. The GPS receiver 810 is generally positioned within the vicinity (20-30 km) of the GPS data display unit 800. Because of the relative proximity of the GPS receiver 810 and the GPS data display unit 800, the list of visible satellites is virtually the same for the GPS receiver 810 and the GPS data display unit 800. The GPS data display unit 800 generates a 2D bar code with the GPS assistance data encoded therein in step 805. The GPS data display unit 800 displays the 2D bar code in which the GPS assistance data is encoded in step 807.

A positioning device 830 equipped with a 2D bar code reader such as a camera scans the bar code in step 833 to obtain GPS assistance data in step 835. The GPS assistance data is then passed on to the GPS receiver within the positioning device 830. Alternatively, the GPS assistance data may be communicated to an external device via a wired or wireless communication link for use by the external device in faster location determination. The GPS receiver uses the GPS assistance data to lock into GPS satellites in step 837 and determine the position of the positioning device 830 in step 839.

When GPS assistance data is obtained by scanning a 2D code, the Time-To-First-Fix (TTFF) is reduced because the GPS receiver no longer has the task of decoding the navigation data bits, which takes tens of seconds. Instead, the GPS assistance data encoded in the 2D bar code provides the satellite orbit and clock parameter values to the GPS receiver. A shorter TTFF results in reduced power consumption because the positioning device 830 does not have to wait for the GPS receiver to decode the navigation data for each visible satellite. With the GPS assistance data provided by the 2D bar codes, the size of the search space is greatly reduced and the TTFF is shortened from minutes to seconds. For example, ephemeris data is transmitted by a satellite every 30 seconds but is updated every 2 hours and is generally valid for 4 hours. Therefore, the ephemeris data may be up to two hours old and ephemeris data that is up to four hours old is considered valid for calculating positions. However, this 4 hour old data may not indicate the satellite's actual position. Therefore, if a fast TTFF is needed, ephemeris data may be provided using a bar code which enables a GPS receiver to set the time as well as provide a position fix in less than ten seconds. An example of a GPS data display unit is described below with reference to FIG. 9.

Figure 9:
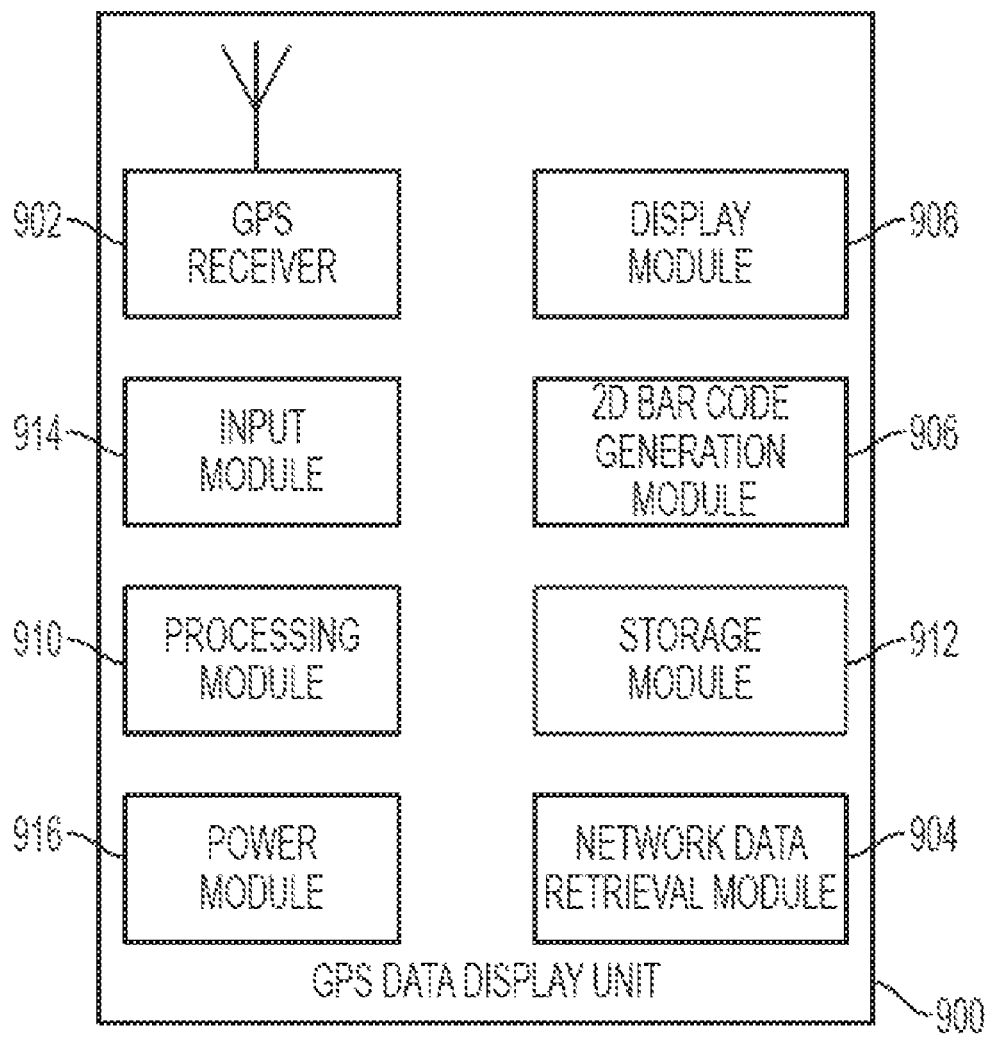
FIG. 9 illustrates GPS data display unit according to an exemplary embodiment of the present invention.

FIG. 9 illustrates GPS data display unit according to an exemplary embodiment of the present invention.

Referring to FIG. 9, the GPS data display unit 900 includes, among others, a GPS receiver module 902, a network data retrieval module 904, a bar code generation module 906, a display module 908, a processing module 910, a storage module 912, an input module 914 and a power module 916.

The GPS receiver module 902 receives GPS signals from one or more GPS satellites in order to acquire GPS assistance data. The GPS receiver module 902 may be a reference GPS receiver that receives GPS signals from one or more GPS satellites. The network data retrieval module 904 receives GPS assistance data from an assistance server. The bar code generation module 906 generates a 2D bar code that has the GPS assistance data received from at least one of the GPS receiver module 902 and the network data retrieval module 904 encoded therein. The display module 908 displays the 2D bar code generated by the bar code generation module 906. The display module 908 may be implemented using any available display technology, such as Liquid Crystal Display (LCD), Organic Light Emitting Diode (OLED), etc. The processing module 910 controls overall operations of the GPS data display unit 900. The storage module 912 stores data used to perform, or data generated in the performance of, any of the operations of the other modules. The input module 914 receives input from a user for use by any of the other modules. The power module 916 provides power to the GPS data display unit 900.

In operation, the GPS assistance data is acquired by the GPS receiver 902 and/or through the network data retrieval module 904, and is passed on to the 2D bar code generator 906 to be mapped into a 2D bar code. The 2D bar code is then displayed on the display module 908. The GPS assistance data may also be stored in the storage module 912 for future use. The different modules of the GPS data display unit 900 may be implemented in a distributed way where some modules are located at a different physical location than the other modules, an example of which is described below with reference to FIG. 10.

Figure 10:
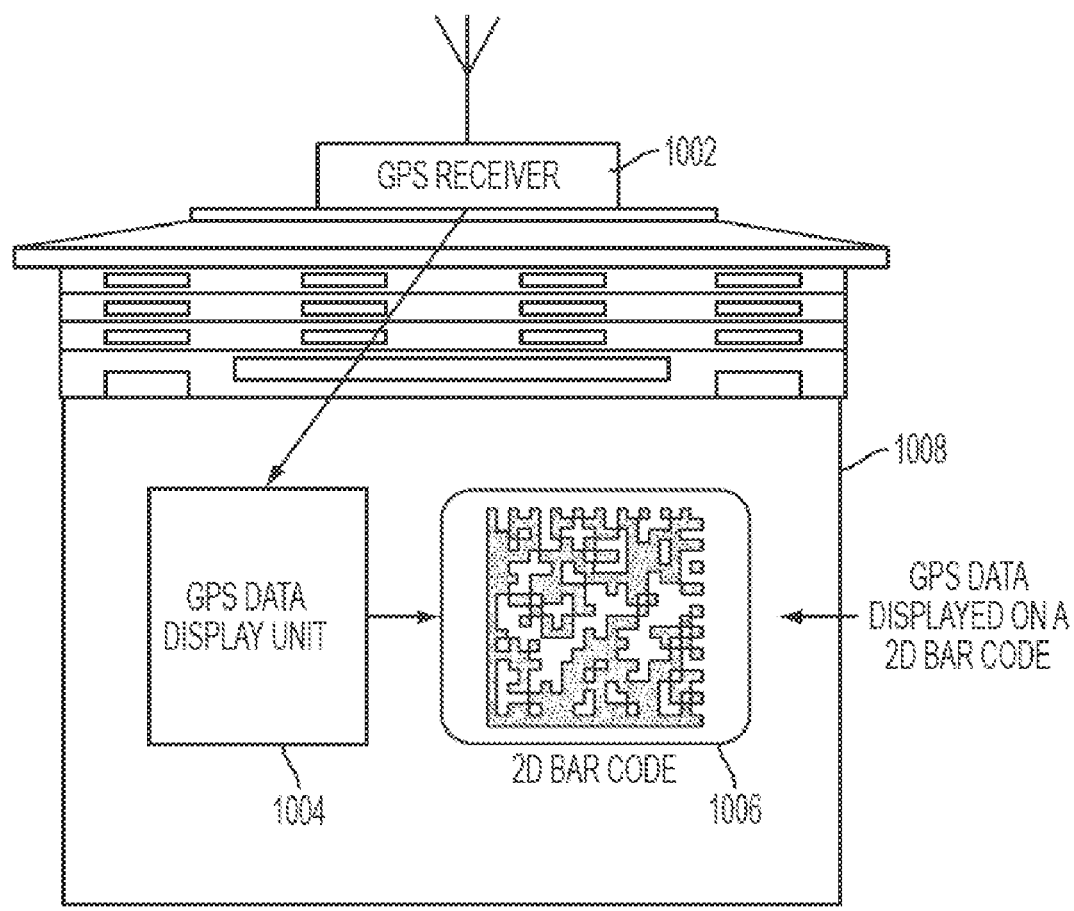
FIG. 10 illustrates an arrangement of a GPS data display unit according to an exemplary embodiment of the present invention.

FIG. 10 illustrates an arrangement of a GPS data display unit according to an exemplary embodiment of the present invention.

Referring to FIG. 10, a GPS receiver and/or GPS antenna 1002 are located outside a structure 1008, such as on a rooftop where there is an unobstructed view of the sky. In contrast, a display module 1006 is located inside the structure 1008. Alternatively, the display module 1006 may be located in an urban canyon were reception of GPS signals is hindered. Here, GPS assistance data is acquired by a GPS receiver 1002 and is passed on to a 2D data display unit 1004 to be mapped into a 2D bar code, which is then displayed by the display module 1006.

The availability of GPS assistance data via 2D codes in a harsh environment greatly reduces TTFF and provides faster position information to positioning devices. Once the positioning device is able to calculate its location using the GPS assistance data provided by a 2D bar code, the positioning device can keep track of its location when moving from one place to the other. This way the performance of Location Based Services (LBSs) can be greatly improved because users are able to locate their exact position and navigate in environments where GPS signals are weaker. An example of a positioning device is described below with reference to FIG. 11.

Figure 11:
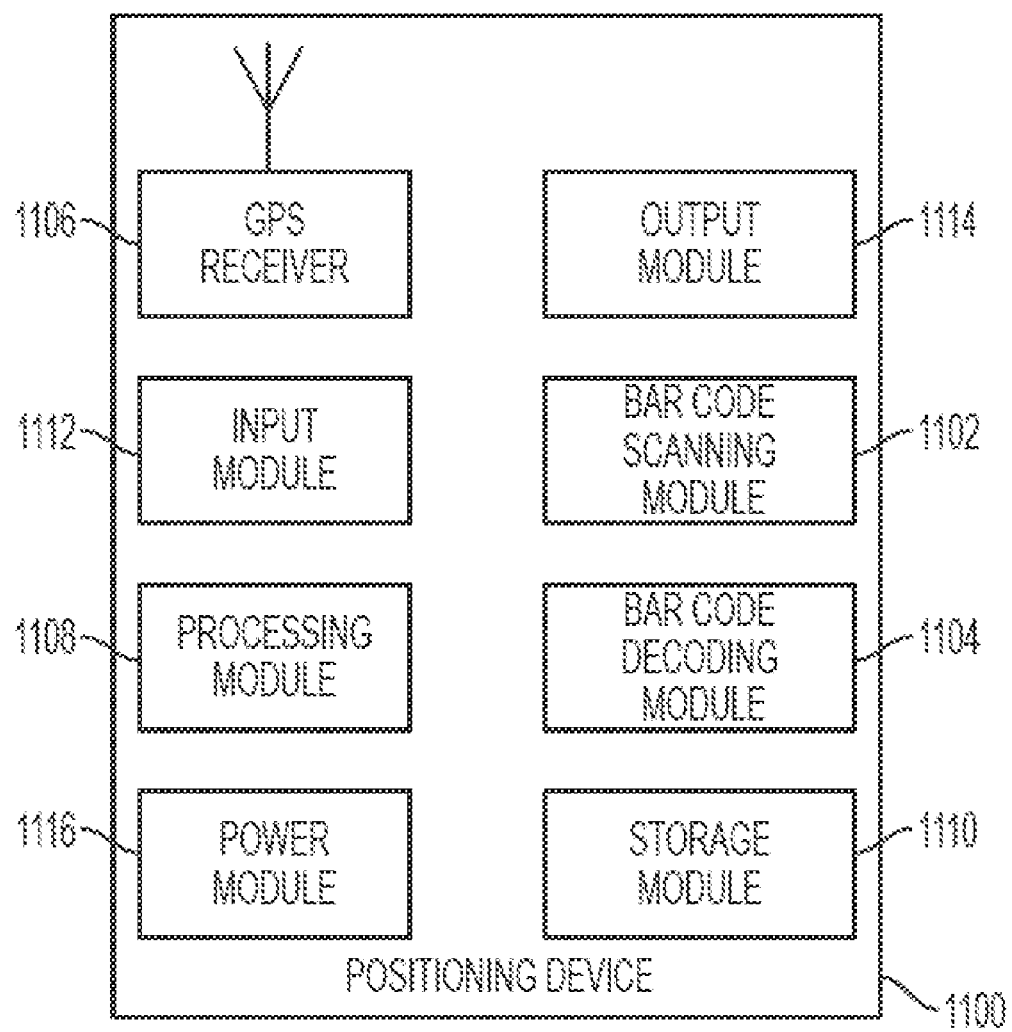
FIG. 11 illustrates a positioning device according to an exemplary embodiment of the present invention.

FIG. 11 illustrates a positioning device according to an exemplary embodiment of the present invention.

Referring to FIG. 11, the positioning device 1100 includes, among others, a bar code scanner module 1102, a bar code decoding module 1104, a GPS receiver module 1106, a processing module 1108, a storage module 1110, an input module 1112, an output module 1114, and a power module 1116.

The bar code scanner module 1102 scans 2D bar codes and provides the bar code data to the bar code decoding module 1104. The bar code decoding module 1104 decodes the 2D bar code data to acquire GPS assistance data encoded therein. The GPS receiver module 1106 receives GPS signals from one or more GPS satellites using the GPS assistance data. The processing module 1108 controls overall operations of the positioning device 1100. The storage module 1110 stores data used to perform, or data generated in the performance of, any of the operations of the other modules, such as the GPS assistance data. The input module 1112 receives input from a user for use by any of the other modules. The output module 1114 outputs information to a user, such as location information or information related to an LBS. The output module 1114 may be a display implemented using any available display technology, such as LCD, OLED, etc. The power module 1116 provides power to the positioning device 1100. The positioning device 1110 may be used with one or more LBSs requiring access to location information.

In operation, a 2D bar code is scanned by the 2D bar code scanning module 1102. The resulting 2D bar code data is used by the 2D bar code decoding module 1104 to acquire GPS assistance data encoded in the 2D bar code data. The GPS assistance data is used by the GPS receiver module 1106 when locking onto one or more GPS satellite signals to determine its position.

The modules of a positioning device 1100 described above may be implemented using different devices to achieve the goal of enhanced positioning by using bar codes, an example of which is described below with reference to FIG. 12.

Figure 12:
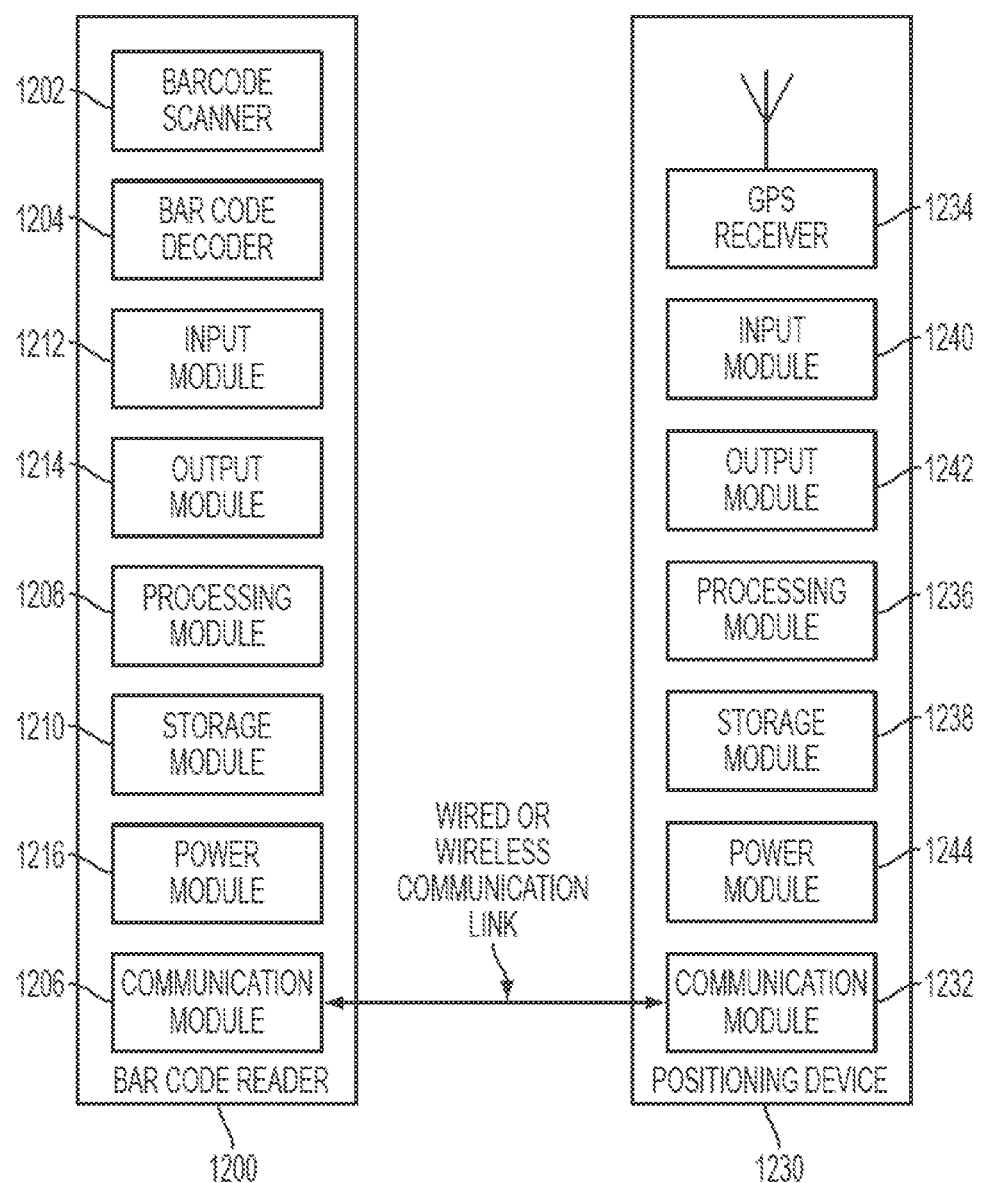
FIG. 12 illustrates a bar code reader device and a positioning device used to perform GPS positioning using GPS assistance data provided via 2D bar codes according to an exemplary embodiment of the present invention.

FIG. 12 illustrates a bar code reader device and a positioning device used to perform GPS positioning using GPS assistance data provided via 2D bar codes according to an exemplary embodiment of the present invention.

Referring to FIG. 12, bar code reader device 1200 and a positioning device 1230 are shown.

The bar code reader device 1200 includes, among others, a bar code scanner module 1202, a bar code decoding module 1204, a communication module 1206, a processing module 1208, a storage module 1210, an input module 1212, an output module 1214, and a power module 1216.

The bar code scanner module 1202 scans 2D bar codes and provides the bar code data to the bar code decoding module 1204. The bar code decoding module 1206 decodes the 2D bar code data to acquire GPS assistance data encoded therein. The communication module 1206 communicates the GPS assistance data to the positioning device 1230 via at least one of wired and wireless communication. The processing module 1208 controls overall operations of the bar code reader device 1200. The storage module 1210 stores data used to perform, or data generated in the performance of, any of the operations of the other modules, such as the GPS assistance data. The input module 1212 receives input from a user for use by any of the other modules. The output module 1214 outputs information to a user. The output module 1214 may be a display implemented using any available display technology, such as LCD, OLED, etc. The power module 1216 provides power to the bar code reader device 1200.

The positioning device 1230 includes, among others, a communication module 1232, a GPS receiver module 1234, a processing module 1236, a storage module 1238, an input module 1240, an output module 1242, and a power module 1244.

The communication module 1232 receives the GPS assistance data from the bar code reader device 1200 via at least one of wired and wireless communication. The GPS receiver module 1234 receives and locks onto GPS signals from one or more GPS satellites using the GPS assistance data received by the communication module 1232. The processing module 1236 controls overall operations of the positioning device 1230. The storage module 1238 stores data used to perform, or data generated in the performance of, any of the operations of the other modules, such as the GPS assistance data. The input module 1240 receives input from a user for use by any of the other modules. The output module 1242 outputs information to a user, such as location information or information related to an LBS. The output module 1242 may be a display implemented using any available display technology, such as LCD, OLED, etc. The power module 1244 provides power to the positioning device 1230. The positioning device 1230 may be used with one or more LBSs requiring access to location information.

In this exemplary implementation, the bar code reading functions are implemented in the bar code reader device 1200 and the positioning functions implemented in the positioning device 1230. In this arrangement, the bar code reader device 1200 scans and decodes a bar code to obtain the GPS assistance data. The bar code reader device 1200 then passes the GPS assistance data to the positioning device 1230 via wired or wireless communication. An example of a wired communication is communication via a Universal Serial Bus (USB). Examples of wireless communication include Wi-Fi and Bluetooth™. Either or both of the bar code reader device 1200 and the positioning device 1230 may be an MS. An exemplary implementation of the bar code reader device 1200 and a positioning device 1230 of FIG. 12 is described below with reference to FIG. 13.

Figure 13:
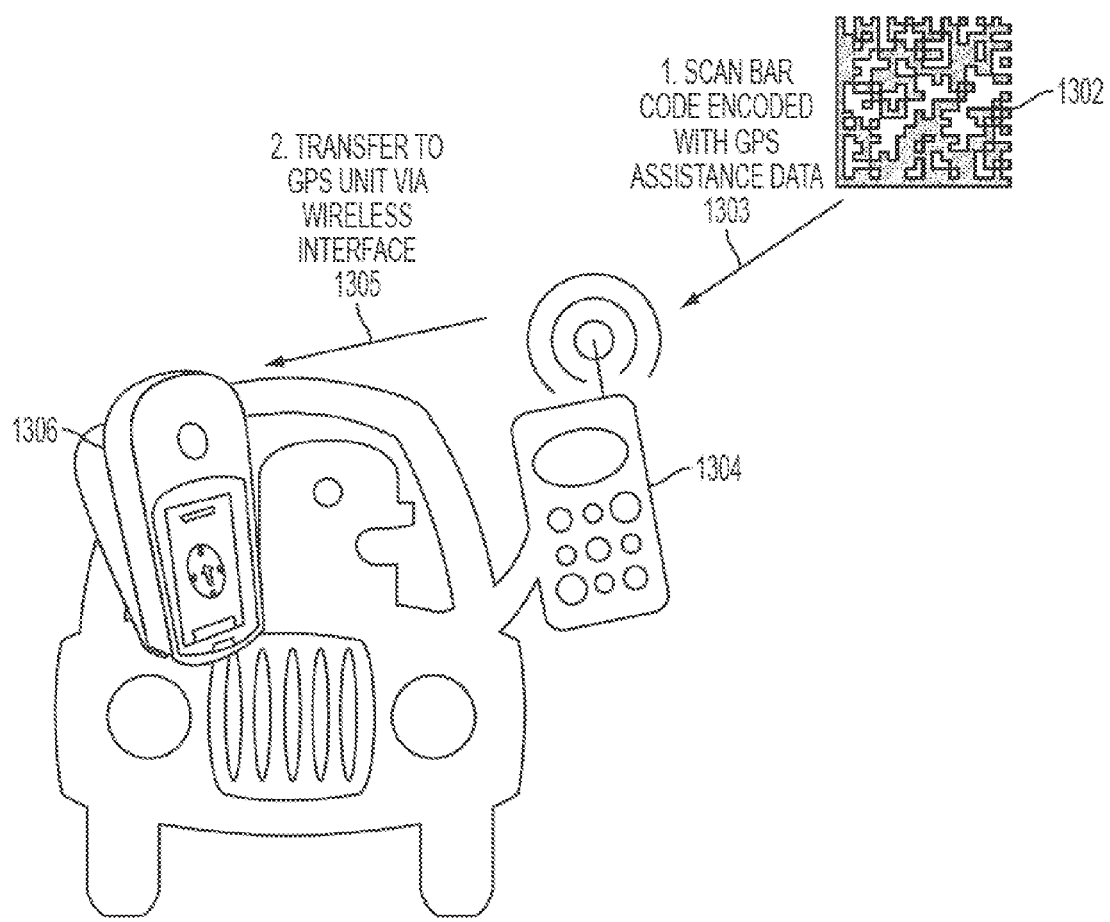
FIG. 13 illustrates GPS positioning using GPS assistance data provided via 2D bar codes according to an exemplary embodiment of the present invention.

FIG. 13 illustrates GPS positioning using GPS assistance data provided via 2D bar codes according to an exemplary embodiment of the present invention.

Referring to FIG. 13, an MS 1304 having a bar code scanning capability scans a 2D bar code 1302 that is encoded with GPS assistance data in step 1303. Here, the MS 1304 acquires the GPS assistance data from the scanned 2D bar code 1302. In step 1304, the MS 1304 communicates the GPS assistance data to a GPS unit 1306. The communication may be via a Bluetooth™ connection. Here, the GPS unit 1306 uses the GPS assistance data to lock onto GPS signals.

In an exemplary embodiment of the present invention, the 2D bar code displayed by the GPS data display unit may include its 2D (i.e., latitude and longitude) position or 3D (i.e., latitude, longitude and altitude) position in addition to or instead of the GPS assistance data. Information on the 2D or 3D position of the GPS data display unit may hereafter be referred to as location data. In this case, the location data may be encoded in a standard format such as a Geography Markup Language (GML). An example of a process of generating a 2D bar code that includes location data and GPS assistance data is described below with reference to FIG. 14.

Figure 14:
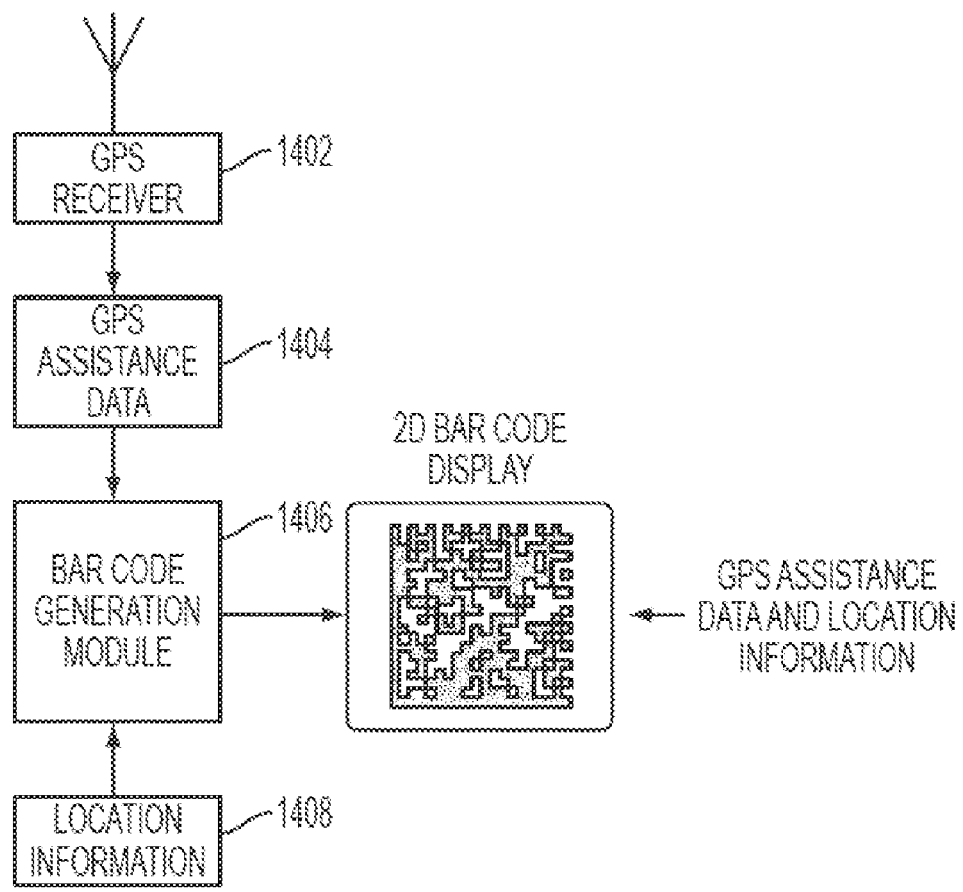
FIG. 14 illustrates the process of generating a 2D bar code that includes position information and GPS assistance data according to an exemplary embodiment of the present invention.

FIG. 14 illustrates the process of generating a 2D bar code that includes position information and GPS assistance data according to an exemplary embodiment of the present invention.

Referring to FIG. 14, GPS assistance data 1404 is obtained from a GPS receiver 1402, which may be located remotely from a GPS data display unit. The GPS assistance data 1404 is input to a bar code generation module 1406. Location data 1408 of the GPS data display unit may be input to the bar code generation module 1406. Here, the location data 1408 is not determined by the GPS receiver 1402. The bar code generation module 1406 encodes the GPS assistance data 1404 and the location data 1408 into a 2D bar code and the generated 2D bar code 1410 is displayed on a display unit and made readily available to positioning devices.

In this exemplary embodiment of the present invention, positioning devices may obtain the GPS assistance data 1404 as well as their approximate position based on the location data 1408 of the GPS data display unit, assuming that the positioning device is sufficiently close to the GPS data display unit when the bar code is scanned. By obtaining the GPS assistance data 1404 as well as the location data 1408, the positioning device may keep track of its location even when the received GPS signals are weak.

In an exemplary embodiment of the present invention, both the GPS assistance data and the location of the GPS data display unit may be obtained from a GPS receiver, an example of which is described below with reference to FIG. 15.

Figure 15:
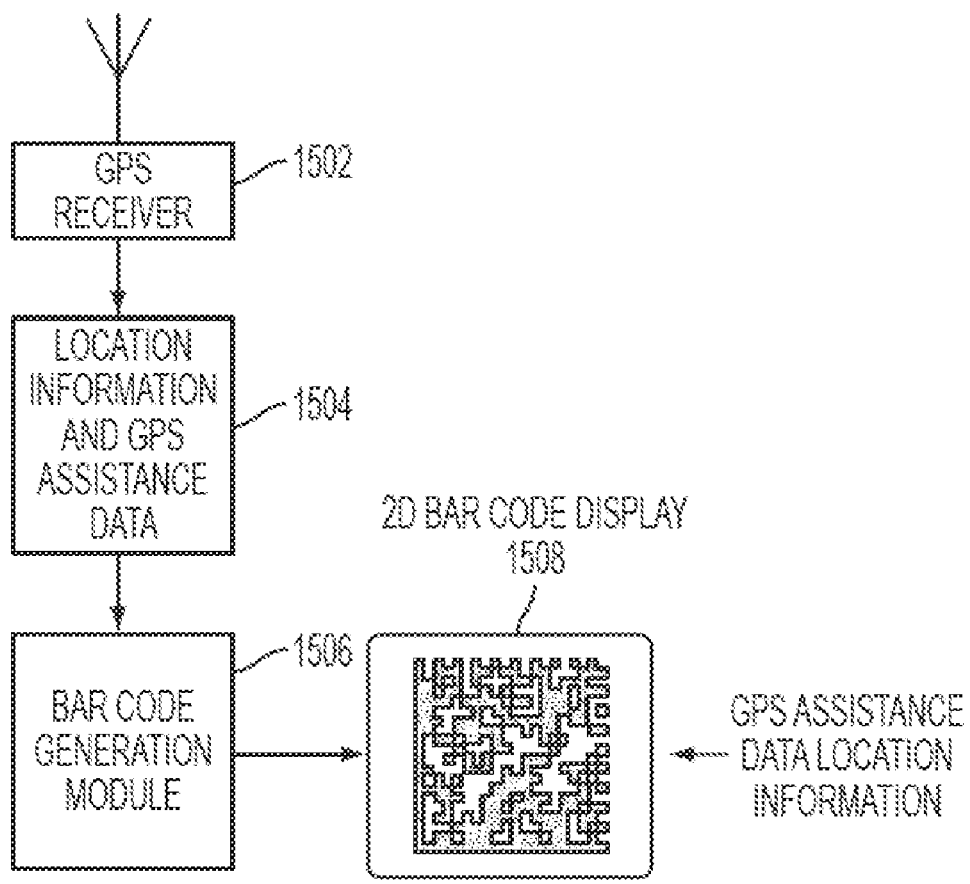
FIG. 15 illustrates the process of generating a 2D bar code that includes position information and GPS assistance data according to an exemplary embodiment of the present invention.

FIG. 15 illustrates the process of generating a 2D bar code that includes position information and GPS assistance data according to an exemplary embodiment of the present invention.

Referring to FIG. 15, the GPS assistance data and location data 1504 is obtained from a GPS receiver 1502, which may be disposed with a GPS data display unit. The GPS receiver 1502 may continuously monitor for GPS signals to obtain the GPS assistance data and location data 1504. The GPS assistance data and the location data 1504 is input to a bar code generation module 1506. The bar code generation module 1506 encodes the GPS assistance data and location data 1504 into a 2D bar code and the generated 2D bar code 1508 is displayed on a display unit and made readily available to positioning devices.

This exemplary embodiment of the present invention is applicable to cases where the GPS data display unit 1504 is nomadic or mobile. Here, the positioning devices may not need to continually monitor for the GPS assistance data to locate their position, thereby conserving processing and power resources. When access to location information is required, a user may simply scan a nearby 2D bar code displaying the GPS assistance data and location data.

In an exemplary embodiment of the present invention, both the GPS assistance data and the location data may be encoded and displayed in respective 2D bar codes, an example of which is described below with reference to FIG. 16.

Figure 16:
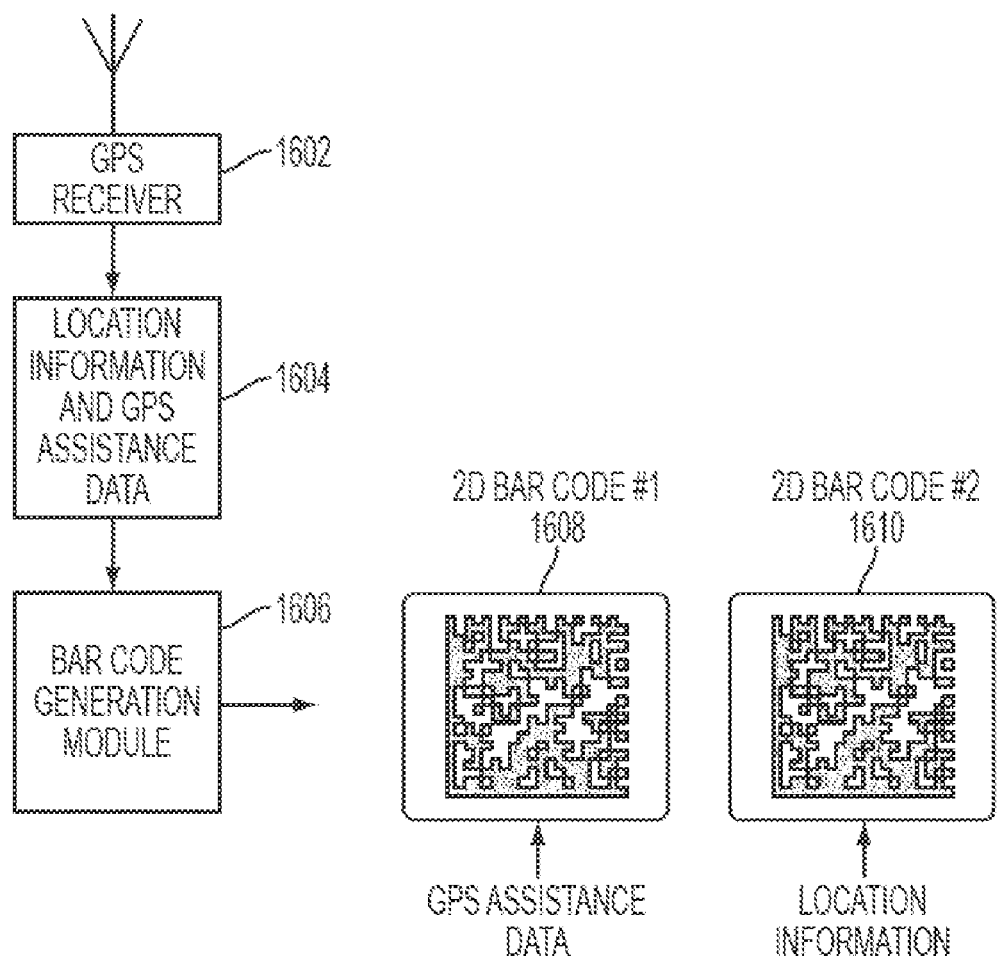
FIG. 16 illustrates the process of generating 2D bar codes that respectively includes position information and GPS assistance data according to an exemplary embodiment of the present invention.

FIG. 16 illustrates the process of generating 2D bar codes that respectively includes location data and GPS assistance data according to an exemplary embodiment of the present invention.

Referring to FIG. 16, the GPS assistance data and location data 1604 is obtained from a GPS receiver 1602, which may be disposed with the GPS data display unit. The GPS receiver 1602 may continuously monitor for GPS signals to obtain the GPS assistance data and location data 1604. The GPS assistance data and location data 1604 is input to a bar code generation module 1606. The bar code generation module 1606 encodes the GPS assistance data into a first 2D bar code 1608 and the location data into a second 2D bar code 1610. The generated 2D bar codes are displayed. Herein the first 2D bar code 1608 and the second 2D bar code 1610 may be simultaneously or sequentially displayed using one or more display devices.

While the GPS assistance data and the location data have been described as being input into the bar code generation module 1606 in a similar manner as shown in FIG. 15, the GPS assistance data and the location of the GPS data display unit may be input into the bar code generation module 1606 in a similar manner as shown in FIG. 14. In addition, it is possible to display the GPS assistance data and display location data in many combinations. For example, ephemeris data, almanac data and the location of the GPS data display unit may be displayed in three separate 2D bar codes. It is also possible to multiplex ephemeris data, almanac data and display location data into a data packet where the data packet is transmitted in one or more 2D bar codes as described in U.S. patent application Ser. No. 12/561,015, filed on Sep. 16, 2009, and entitled "Data Communication Using 2D Bar Codes", the entire disclosure of which is hereby incorporated by reference.

In an exemplary embodiment of the present invention an arrangement of a GPS data display unit is provided where a GPS antenna is located on a vehicle, an example of which is described below with reference to FIG. 17.

Figure 17:
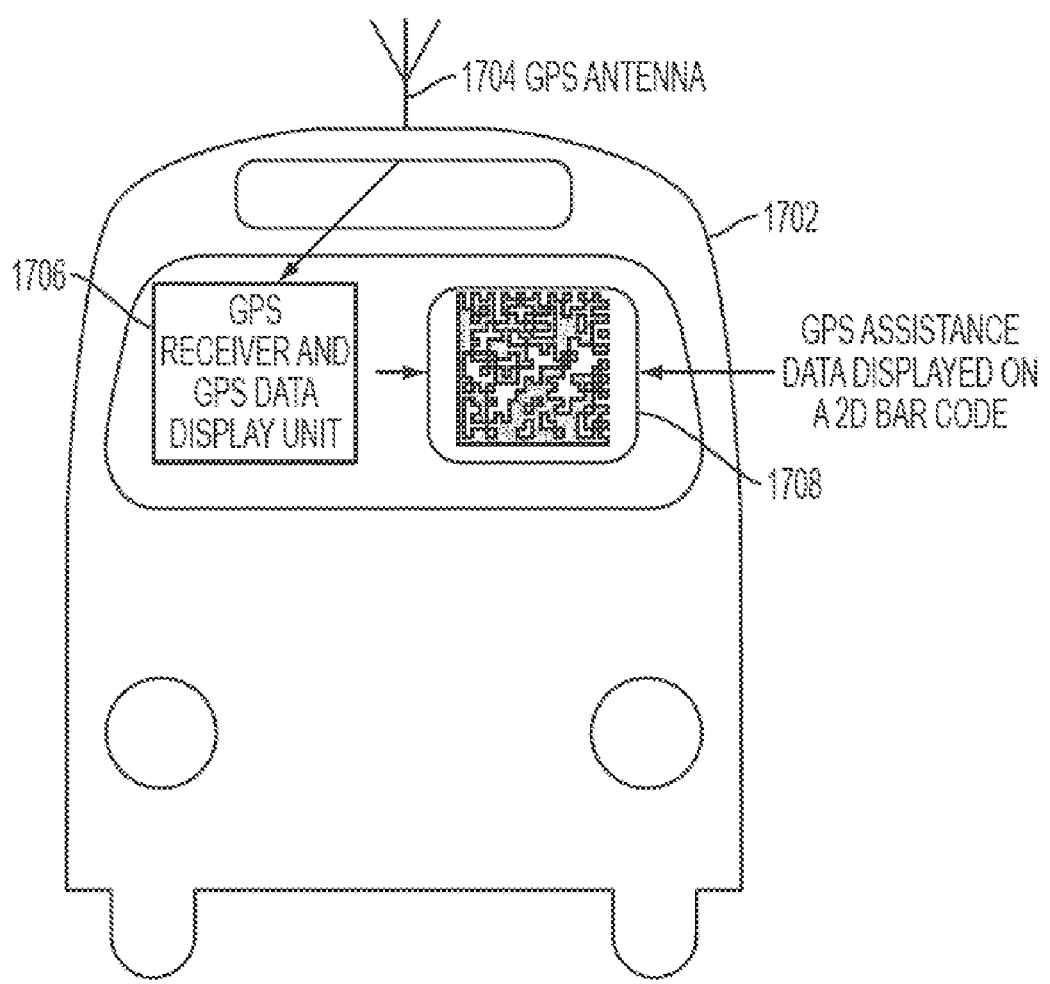
FIG. 17 illustrates an arrangement of a GPS data display unit according to an exemplary embodiment of the present invention.

FIG. 17 illustrates an arrangement of a GPS data display unit according to an exemplary embodiment of the present invention.

Referring to FIG. 17, a GPS antenna 1704 is mounted on top of a vehicle 1702, such as a bus, where the GPS antenna has an unobstructed view of the sky. The GPS signals received by the GPS antenna are input to a GPS receiver and GPS data display unit 1706. The GPS data is then encoded into a 2D bar code 1702 and displayed on a display device located on the vehicle 1702 such that it is visible to other vehicles or pedestrians. It is then possible for positioning devices onboard other vehicles or pedestrians carrying positioning devices to scan the bar code and obtain location data and GPS assistance data.

In an exemplary embodiment of the present invention, bar code displays may be placed on traffic light poles or tollbooths such that vehicles and pedestrians can scan these codes and obtain location data as well as GPS data. These displays can be connected to GPS receivers or assistance servers for obtaining GPS assistance data.

Figure 2:
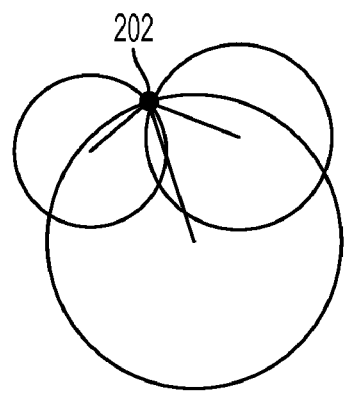
FIG. 2 illustrates Two-Dimensional (2D) positioning based on three satellites according to the related art.
Figure 3:
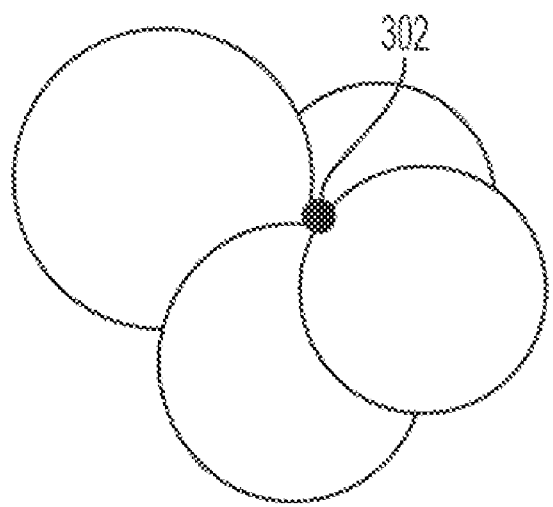
FIG. 3 illustrates Three-Dimensional (2D) positioning based on four satellites according to the related art.
Figure 4:
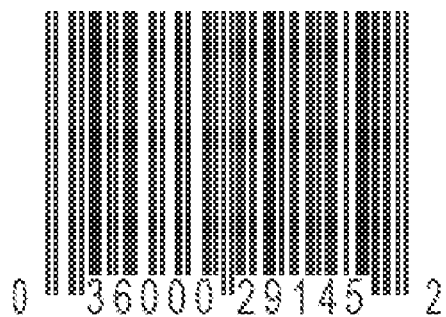
FIG. 4 illustrates a Universal Product Code (UPC) bar code according to the related art.
Figure 5:
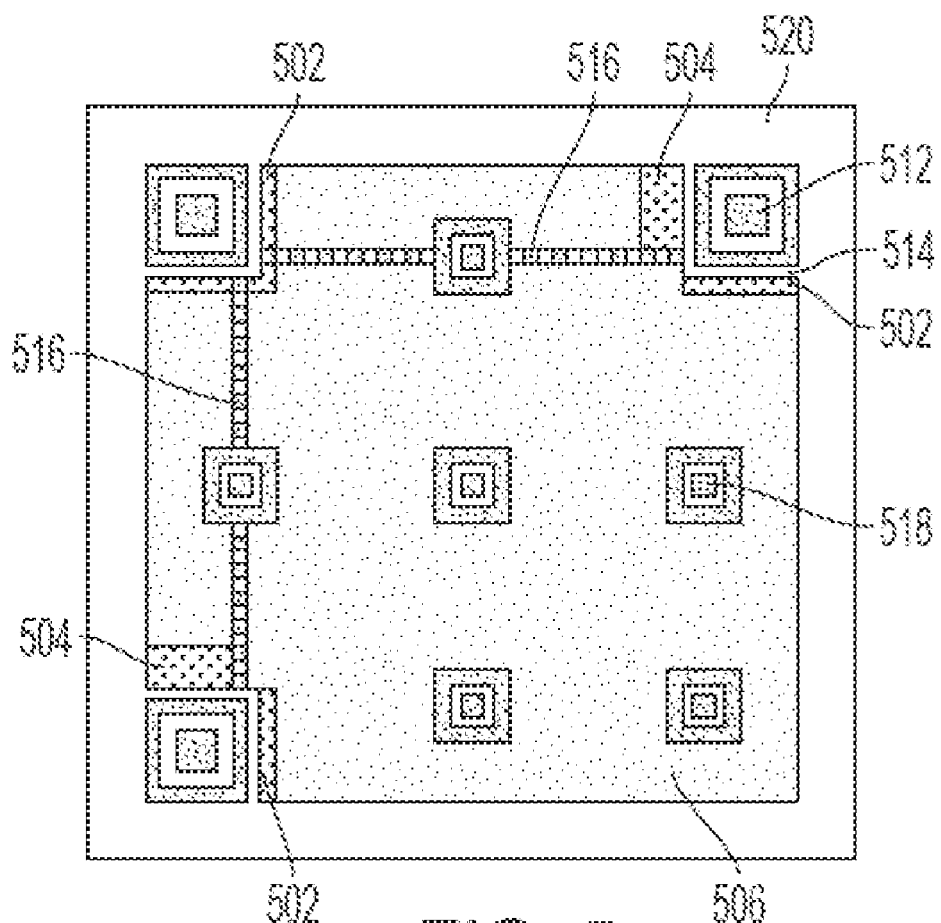
FIG. 5 illustrates a structure of a Version 7 symbol of a Quick Response (QR) 2005 code according to the related art.
Figure 6:
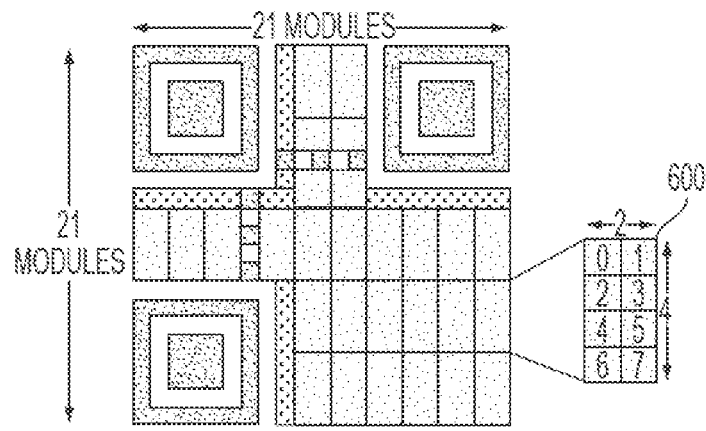
FIG. 6 illustrates a structure of a Version 1 symbol of a QR 2005 code according to the related art.
Figure 7:
FIG. 7 illustrates a High Capacity Color Bar code (HCCB) according to the related art.

In an exemplary embodiment of the present invention, only some parts of the GPS assistance data are provided in a 2D bar code. As described above a GPS receiver needs to lock on to the signal of at least three satellites to calculate a 2D position (i.e., latitude and longitude), as shown in FIG. 2. While the satellites have highly accurate atomic clocks, the GPS receiver generally has a much less accurate and less expensive clock. As a result the GPS receiver will not have exactly the correct amount of time that it took for the radio waves to travel from the satellites. As a result an incorrect position may be determined. A fourth satellite signal may be used to correct the time error. Herein, the GPS time information may be provided using a 2D bar code, an example of which is described below with reference to FIG. 18.

Figure 18:
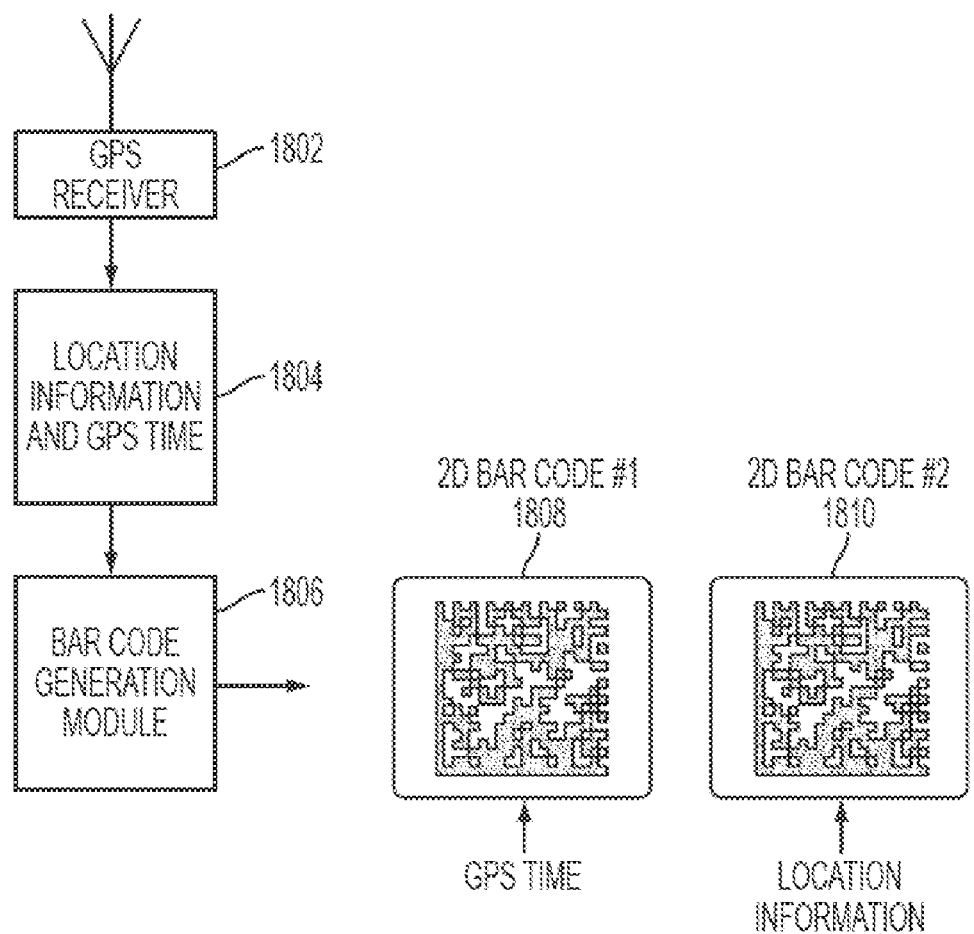
FIG. 18 illustrates the process of generating 2D bar codes that respectively includes position information and GPS time information according to an exemplary embodiment of the present invention.

FIG. 18 illustrates the process of generating 2D bar codes that respectively includes position information and GPS time information according to an exemplary embodiment of the present invention.

Referring to FIG. 18, the GPS time information and the location of the GPS data display unit 1804 is obtained from a GPS receiver 1802, which may be disposed with the GPS data display unit. The GPS receiver 1802 may continuously monitor for GPS signals to obtain the GPS time information and location data 1804. The GPS time information and location data 1804 is input to a bar code generation module 1806. The bar code generation module 1806 encodes the GPS time information into a first 2D bar code 1808 and the location data into a second 2D bar code 1810. The generated 2D bar codes are displayed. Herein the first 2D bar code 1808 and the second 2D bar code 1810 may be simultaneously or sequentially displayed using one or more display devices.

While the GPS assistance data and the location data have been described as being input into the bar code generation module 1806 in a similar manner as shown in FIG. 15, the GPS assistance data and location data may be input into the bar code generation module 1606 in a similar manner as shown in FIG. 14.

When the GPS time information is provided using a 2D bar code, a GPS receiver can determine correct position information using a lesser number of satellites. Since the GPS time information is received from a GPS receiver with an antenna having an unobstructed view of the sky or a assistance server, this allows for the position information to be calculated in harsh conditions where GPS signals are either weak or only a few satellites are visible.

In an exemplary embodiment of the present invention, some parts of the GPS assistance data are obtained from an assistance server over a wireless link while other parts of the GPS assistance data are obtained by reading a 2D bar code, an example of which is described below with reference to FIG. 19.

Figure 19:
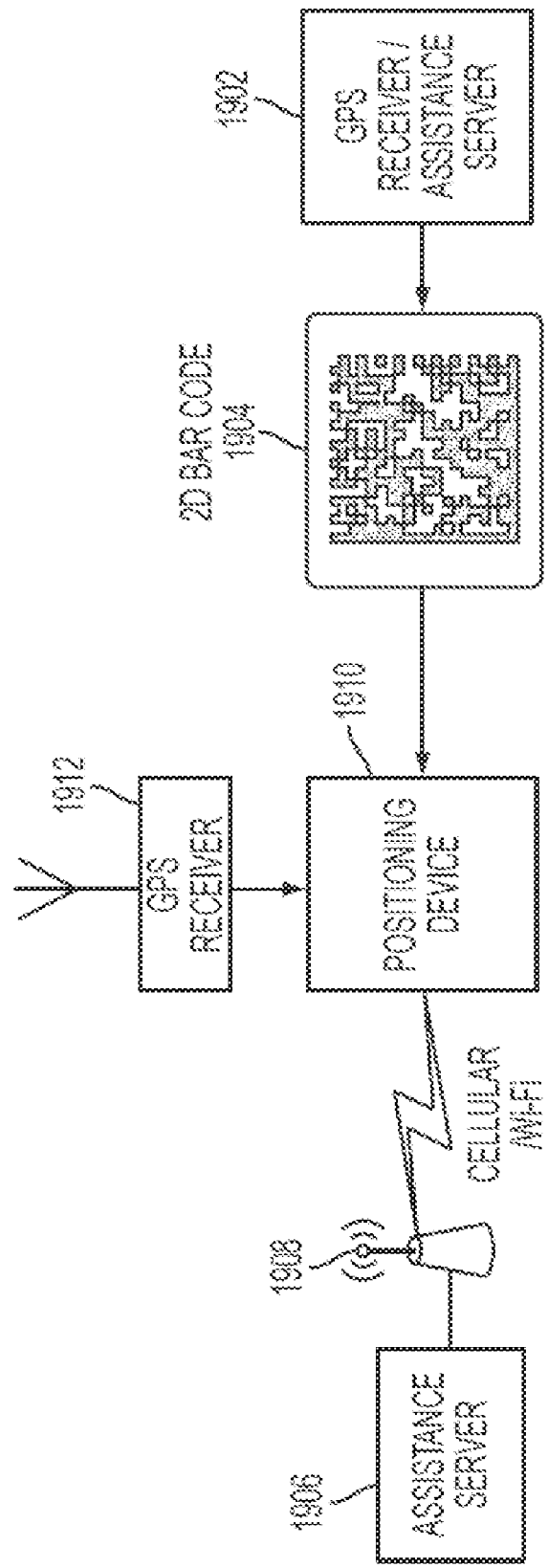
FIG. 19 illustrates the process of obtaining GPS assistance via a 2D bar code and from an assistance server over a wireless link according to an exemplary embodiment of the present invention.

FIG. 19 illustrates the process of obtaining GPS assistance via a 2D bar code and from an assistance server over a wireless link according to an exemplary embodiment of the present invention.

Referring to FIG. 19, a GPS data display unit 1902 generates 2D bar codes 1904 with location data and/or GPS assistance data that is displayed and scanned by the positioning device 1910. Similarly, a GPS assistance server 1906 provides location data and/or GPS assistance data via a wireless system 1908 to the positioning device 1910. The wireless system 1908 may be a cellular system or a Wi-Fi link. The location data and/or GPS assistance data provided by the assistance server 1906 may be different than or comprises different components of the location data and/or GPS assistance data provided by the GPS data display unit 1902. The positioning device 1910 uses the location data and/or GPS assistance data provided by the assistance server 1906 and/or the GPS data display unit 1902 when determining its location using the GPS receiver 1912. Herein, the positioning device 1910 may associate different weights to the location data or the GPS assistance data obtained from different sources. Also, the positioning device 1910 may prioritize location data obtained via a bar code more than the location determined from directly receiving GPS signals. This is because GPS alone, without assistance, can sometimes give wrong position information due to any of a number of the reasons, such as weak signal strength or multipath propagation, etc.

A method to determine whether to invoke a location application based on a 2D bar code is described below with reference to FIG. 20.

Figure 20:
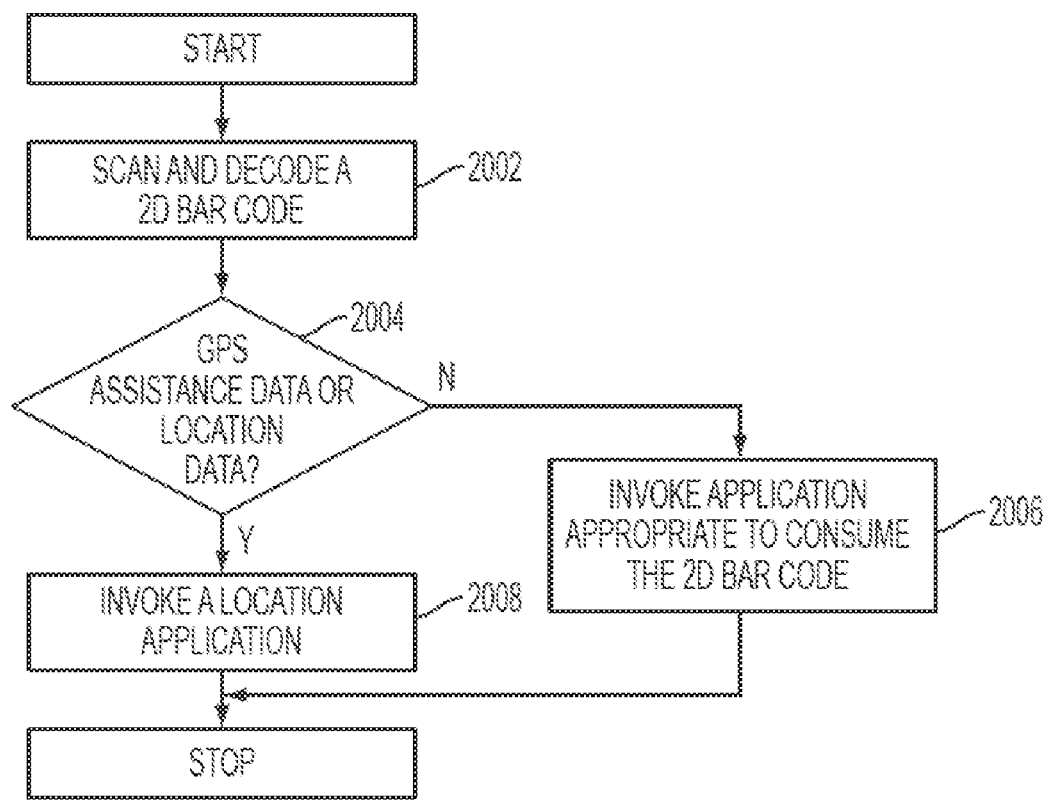
FIG. 20 is a flowchart for determining whether to invoke a location application based on a 2D bar code according to an exemplary embodiment of the present invention.

FIG. 20 is a flowchart for determining whether to invoke a location application based on a 2D bar code according to an exemplary embodiment of the present invention.

Referring to FIG. 20, a 2D bar code is scanned and decoded into bar code data in step 2002. In step 2004, it is determined if the bar code data is either GPS assistance data or location data. If it is determined that the bar code data is not GPS assistance data or location data, an application that is appropriate for the bar code data is invoked in step 2006. Thereafter, the process ends. If it is determined that the bar code data is GPS assistance data or location data, a location application is invoked in step 2008. Thereafter, the process ends. The location application may be a service requiring position information. A bit-field in the 2D bar code may be used to indicate the type of data encoded (e.g., GPS assistance or location data) in the 2D bar code. For example, a photo taken with a GPS-equipped camera is tagged with the location information when the user scans a 2D bar code containing GPS assistance data and/or location data just before or after the photo is taken.

A method to determine whether to update a 2D bar code encoded with GPS assistance data and/or location data is described below with reference to FIG. 21.

Figure 21:
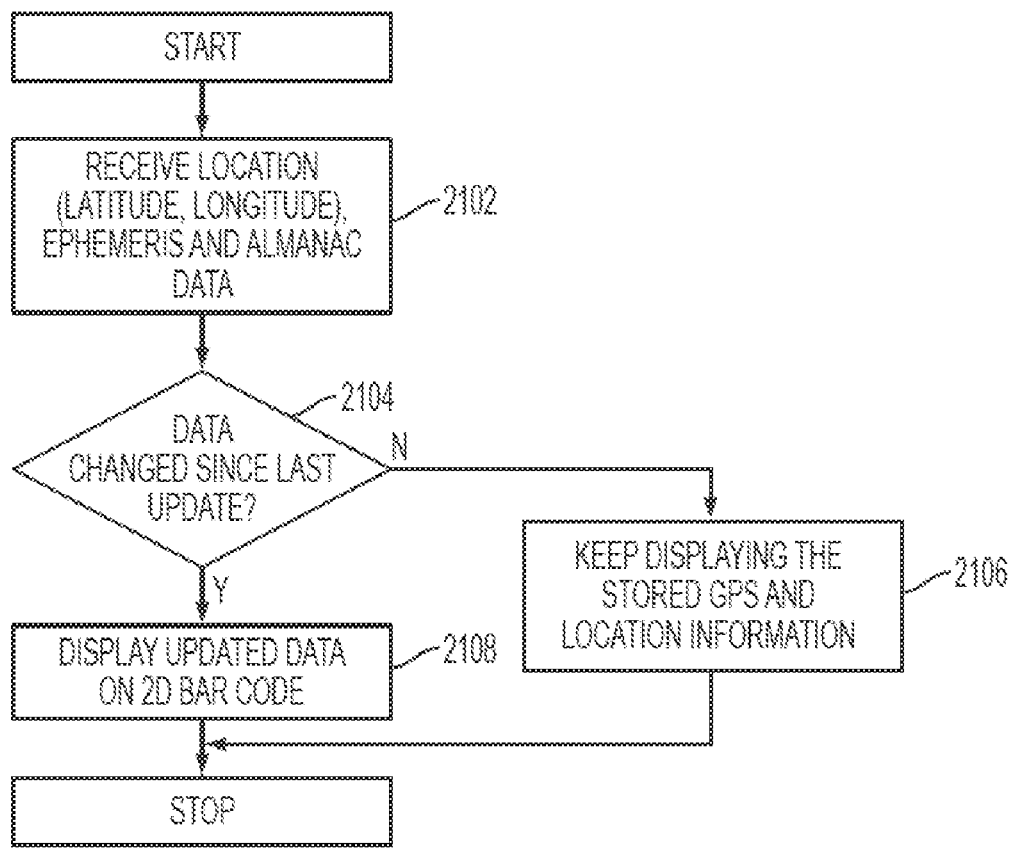
FIG. 21 is a flowchart for determining whether to invoke a location application based on a 2D bar code according to an exemplary embodiment of the present invention.

FIG. 21 is a flowchart for determining whether to invoke a location application based on a 2D bar code according to an exemplary embodiment of the present invention.

Referring to FIG. 21, GPS assistance data and/or location data is received in step 2102. In step 2104, it is determined if the GPS assistance data and/or location data has changed since its last update. If it is determined that the GPS assistance data and/or location data has not changed since its last update, the currently displayed 2D bar code continues to be displayed in step 2106. Thereafter, the process ends. If it is determined that the GPS assistance data and/or location data has changed since its last update, a new 2D bar code is generated that includes the changed GPS assistance data and/or location data in step 2108. Thereafter, the process ends. Herein, it is assumed that the 2D bar code containing GPS data and/or location information is displayed on an LCD, OLED or a similar display that allows the 2D bar code image to be refreshed.

Figure 22:
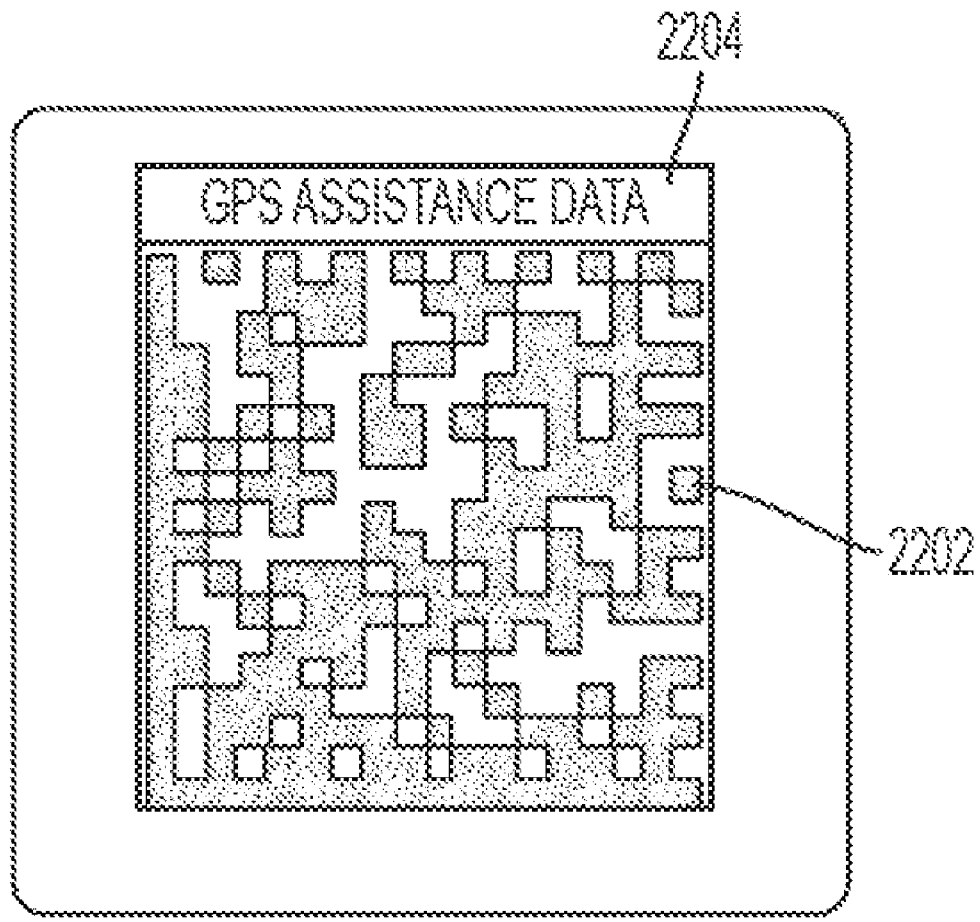
FIG. 22 illustrates a 2D bar code surrounded by a user-friendly label according to an exemplary embodiment of the present invention.

In an exemplary embodiment of the present invention, the 2D bar code in which the GPS assistance data is encoded may be surrounded by a user-friendly label so that a user could more easily identify it among other displayed bar codes, an example of which is shown in FIG. 22.

FIG. 22 illustrates a 2D bar code surrounded by a user-friendly label according to an exemplary embodiment of the present invention.

Referring to FIG. 22, a 2D bar code 2202 is shown that has GPS assistance data encoded therein. The 2D bar code 2202 is surrounded by a label 2204 identifying the 2D bar code 2202 as being a 2D bar code for the positioning service. In other exemplary embodiments, the display can toggle between displaying the label 2204 identifying the 2D bar code 2202 as being a 2D bar code for the positioning service and the 2D bar code with the GPS assistance data encoded therein. In this case, a user can scan the 2D bar code when it is displayed. When the display is displaying a sign such as "GPS Assistance Data", the user needs to wait for the display to toggle to the 2D bar code to perform the scanning.

In an exemplary embodiment of the present invention, the GPS assistance or location data may be encrypted using an encryption key such that only users that have a valid decryption key can decode the assistance data. An example of using encrypted GPS assistance or location data is described below with reference to FIG. 23.

Figure 23:
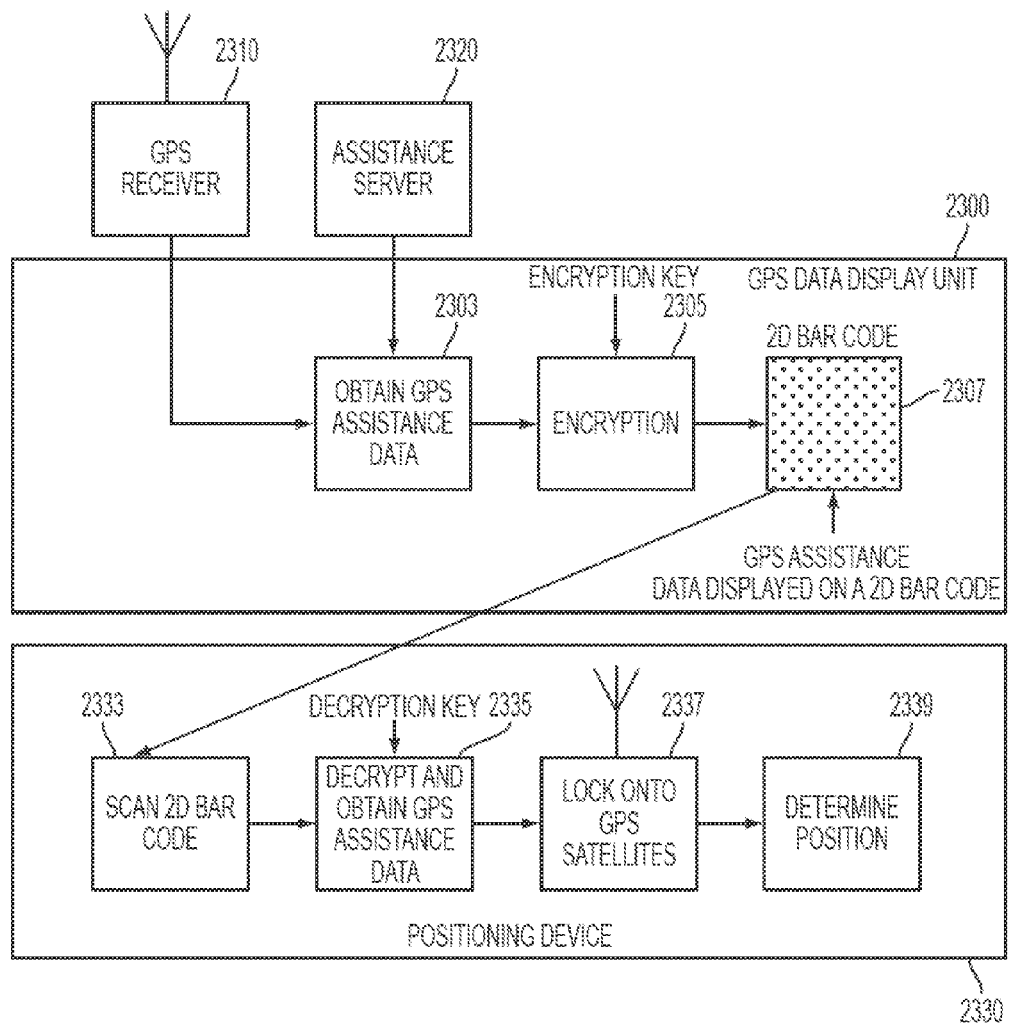
FIG. 23 illustrates GPS positioning using encrypted GPS assistance or location data provided via 2D bar codes according to an exemplary embodiment of the present invention.

FIG. 23 illustrates GPS positioning using encrypted GPS assistance or location data provided via 2D bar codes according to an exemplary embodiment of the present invention.

Referring to FIG. 23, a GPS data display unit 2300 obtains GPS data from a GPS receiver 2310 and/or an assistance server 2320 in step 2303. The GPS receiver 2310 may be a reference GPS receiver that receives GPS signals from one or more GPS satellites. In some cases, a first part of the assistance data is obtained from the GPS receiver 2310 and a second part of assistance data is obtained from the assistance server 2320. The GPS receiver 2310 and/or a GPS antenna associated with the GPS receiver 2310 is generally positioned to ensure an unobstructed view of the sky. The GPS receiver 2310 is generally positioned within the vicinity (20-30 km) of the GPS data display unit 2300. Because of the relative proximity of the GPS receiver 2310 and the GPS data display unit 2300, the list of visible satellites is virtually the same for the GPS receiver 2310 and the GPS data display unit 2300. The GPS data display unit 2300 encrypts the GPS assistance data and generates a 2D bar code with the encrypted GPS assistance data encoded therein in step 3405. The GPS assistance data may be encrypted using an encryption key. The GPS data display unit 3400 displays the 2D bar code in which the encrypted GPS assistance data is encoded in step 3407.

A positioning device 2330 equipped with a 2D bar code reader such as a camera scans the bar code in step 2333. In step 2335, the bar code data is decrypted using a valid decryption key to obtain GPS assistance data. The GPS assistance data is then passed on to a GPS receiver within the positioning device 2330. Alternatively, the GPS assistance data may be communicated to an external device via a wired or wireless communication link for use by the external device in faster location determination. The GPS receiver uses the GPS assistance data to lock into GPS satellites in step 2337 and determine the position of the positioning device 2330 in step 2339.

In an exemplary embodiment of the present invention, the assistance or location data encoded in a 2D bar code can be compressed using well-known lossless data compression schemes such as Huffman or Lempel-Ziv coding. The positioning device then scans the 2D bar code containing the compressed data, decodes the compressed assistance data and decompresses the data for use in determining the position. An example of using compressed GPS assistance or location data is described below with reference to FIG. 24.

Figure 24:
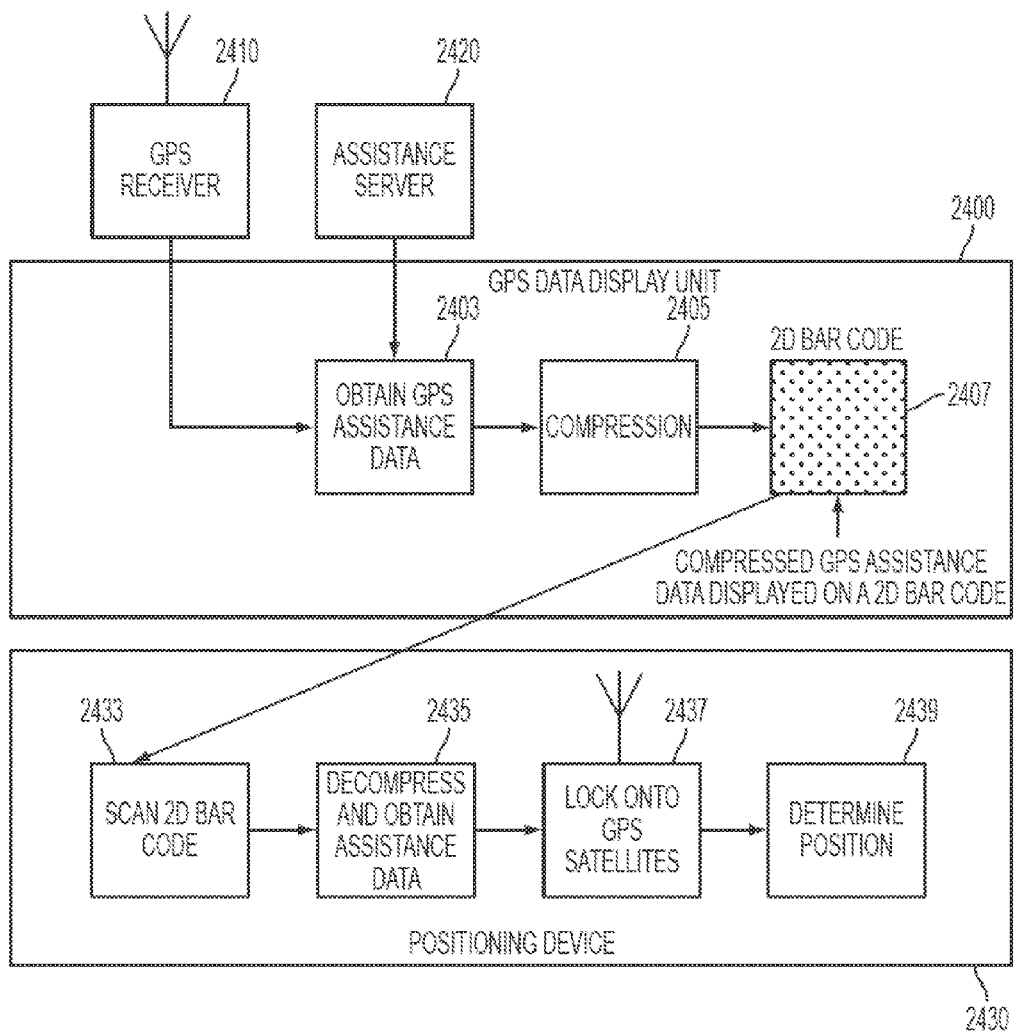
FIG. 24 illustrates GPS positioning using compressed GPS assistance or location data provided via 2D bar codes according to an exemplary embodiment of the present invention.

FIG. 24 illustrates GPS positioning using compressed GPS assistance or location data provided via 2D bar codes according to an exemplary embodiment of the present invention.

Referring to FIG. 24, a GPS data display unit 2400 obtains GPS data from a GPS receiver 2410 and/or an assistance server 2420 in step 2403. The GPS receiver 2310 may be a reference GPS receiver that receives GPS signals from one or more GPS satellites. In some cases, a first part of the assistance data is obtained from the GPS receiver 2410 and a second part of assistance data is obtained from the assistance server 2420. The GPS receiver 2410 and/or a GPS antenna associated with the GPS receiver 2410 is generally positioned to ensure an unobstructed view of the sky. The GPS receiver 2410 is generally positioned within the vicinity (20-30 km) of the GPS data display unit 2400. Because of the relative proximity of the GPS receiver 2410 and the GPS data display unit 2400, the list of visible satellites is virtually the same for the GPS receiver 2410 and the GPS data display unit 2400. The GPS data display unit 2400 compresses the GPS assistance data and generates a 2D bar code with the compressed GPS assistance data encoded therein in step 2405. The GPS data display unit 2400 displays the 2D bar code in which the compressed GPS assistance data is encoded in step 2407.

A positioning device 2430 equipped with a 2D bar code reader such as a camera scans the bar code in step 2433. In step 2435, the bar code data is decompressed to obtain GPS assistance data. The GPS assistance data is then passed on to a GPS receiver within the positioning device 2430. Alternatively, the GPS assistance data may be communicated to an external device via a wired or wireless communication link for use by the external device in faster location determination. The GPS receiver uses the GPS assistance data to lock into GPS satellites in step 2437 and determine the position of the positioning device 2430 in step 2439.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating a bar code to assist with positioning, the method comprising:

obtaining Global Positioning System (GPS) assistance data;

generating a bar code with the GPS assistance data encoded therein; and displaying the bar code.

2. The method of claim 1, wherein the bar code comprises a Two Dimensional (2D) bar code.

3. The method of claim 1, wherein the GPS assistance data is obtained from at least one of a GPS receiver and an assistance server.

4. The method of claim 3, wherein the GPS assistance data obtained from the assistance server is obtained through a wireless network.

5. The method of claim 1, further comprising obtaining location data, wherein the bar code is generated with both the location data and the GPS assistance data encoded therein.

6. The method of claim 1, further comprising:

obtaining location data; and generating a bar code with the location data encoded therein, wherein the bar code with the location data encoded therein and the bar code with the GPS assistance data encoded therein are displayed one of simultaneously and sequentially.

7. The method of claim 1, wherein the GPS assistance data comprises GPS time data.

8. The method of claim 1, further comprising:

determining if the GPS assistance data has changed; and if it is determined that the GPS assistance data has changed, generating a new bar code with the changed GPS assistance data encoded therein, and displaying the new bar code.

9. The method of claim 1, wherein the bar code includes a label that enables the bar code to be identified as being usable for positioning.

10. The method of claim 1, further comprising encrypting the GPS assistance data before the bar code is generated.

11. The method of claim 1, further comprising compressing the GPS assistance data before the bar code is generated.

12. A method for using a bar code to assist with positioning, the method comprising:

scanning a bar code;

obtaining Global Positioning System (GPS) assistance data from the scanned bar code;

receiving and locking onto one or more GPS signals by using the GPS assistance data; and determining a position using the received one or more GPS signals.

13. The method of claim 12, wherein the bar code comprises a Two Dimensional (2D) bar code.

14. The method of claim 12, further comprising obtaining location data from the scanned bar code, wherein the location data is used to determine an approximate location without using the one or more GPS signals.

15. The method of claim 12, further comprising:

scanning another bar code;

obtaining location data from the scanned other bar code; and determining an approximate location based on the location data without using the one or more GPS signals, wherein the bar code and the other bar code are scanned one of simultaneously and sequentially.

16. The method of claim 12, wherein the GPS assistance data comprises GPS time data.

17. The method of claim 12, further comprising:

determining if the scanned bar code has GPS assistance data; and if it is determined that the scanned bar code has GPS assistance data, invoking a location application.

18. The method of claim 12, wherein the obtaining of the GPS assistance data comprises decrypting the GPS assistance data.

19. The method of claim 12, wherein the obtaining of the GPS assistance data comprises uncompressing the GPS assistance data.

20. An apparatus for generating and displaying a bar code to assist with positioning, the apparatus comprising:

a Global Positioning System (GPS) receiver for receiving signals from one or more GPS satellites and for obtaining GPS assistance data;

a bar code generator for generating a bar code with the GPS assistance data encoded therein; and a display for displaying the bar code.

21. The apparatus of claim 20, wherein the bar code comprises a Two Dimensional (2D) bar code.

22. The apparatus of claim 20, wherein the GPS assistance data is obtained from at least one of the GPS receiver and an assistance server.

23. The apparatus of claim 22, wherein, when the GPS assistance data is obtained from the assistance server, the GPS assistance data is obtained from the assistance server through a wireless network.

24. The apparatus of claim 20, wherein at least one of the GPS receiver and an antenna associated with the GPS receiver is located so as to have an unobstructed view of the sky, and wherein the display is located in an area that has an obstructed view of the sky.

25. The apparatus of claim 20, wherein the GPS receiver obtains location data, and wherein the bar code generator generates the bar code with both the location data and the GPS assistance data encoded therein.

26. The apparatus of claim 20, wherein the GPS receiver obtains location data, wherein the bar code generator generates another bar code with the location data encoded therein, and wherein the bar code and the other bar code are displayed one of simultaneously and sequentially.

27. The apparatus of claim 20, wherein the GPS assistance data comprises GPS time data.

28. The apparatus of claim 20, wherein, if the GPS assistance data changes, the bar code generator generates a new bar code with the changed GPS assistance data encoded therein, and the display displays the new bar code.

29. The apparatus of claim 20, wherein the bar code includes a label that enables the bar code to be identified as being usable for positioning.

30. The apparatus of claim 20, wherein the bar code generator encrypts the GPS assistance data before the bar code is generated.

31. The apparatus of claim 20, wherein the bar code generator compresses the GPS assistance data before the bar code is generated.

32. An apparatus for using a bar code to assist with positioning, the apparatus comprising:

a bar code scanner for scanning a bar code;

a bar code decoding module for obtaining Global Positioning System (GPS) assistance data from the scanned bar code; and a GPS receiver for receiving and locking onto signals from one or more GPS satellites by using the GPS assistance data, and for determining a position of the apparatus using the received one or more GPS signals.

33. The apparatus of claim 32, wherein the bar code comprises a Two Dimensional (2D) bar code.

34. The apparatus of claim 32, wherein the bar code scanner and bar code decoding module are comprised by a bar code reader that further comprises a first communication module, wherein the GPS receiver is comprised by a positioning device that further comprises a second communication module, wherein the GPS assistance data is communicated by the first communication module to the second communication module, and wherein the first communication module and the second communication module communicate via one of wireless and wired communication.

35. The apparatus of claim 32, wherein the bar code decoding module obtains location data from the scanned bar code, and wherein the location data is used to determine an approximate location without using the one or more GPS signals.

36. The apparatus of claim 32, wherein the bar code scanner scans another bar code and the bar code decoding module obtains location data from the scanned other bar code, wherein the location data is used to determine an approximate location without using the one or more GPS signals, and wherein the bar code and the other bar code are scanned one of simultaneously and sequentially.

37. The apparatus of claim 32, wherein the GPS assistance data comprises GPS time data.

38. The apparatus of claim 32, wherein, if the scanned bar code has GPS assistance data, a location application is invoked.

39. The apparatus of claim 32, wherein the bar code decoding module decrypts the GPS assistance data.

40. The apparatus of claim 32, wherein the bar code decoding module uncompresses the GPS assistance data.

* * * * *